(12) United States Patent
Sønju

(10) Patent No.: US 12,187,391 B2
(45) Date of Patent: Jan. 7, 2025

(54) FLOATING METAL PLATFORM

(71) Applicant: Clovers AS, Son (NO)

(72) Inventor: Eivind Sønju, Son (NO)

(73) Assignee: Clovers AS, Son (NO)

(\*) Notice: Subject to any disclaimer, the term of this patent is extended or adjusted under 35 U.S.C. 154(b) by 153 days.

(21) Appl. No.: 17/763,931

(22) PCT Filed: Sep. 23, 2020

(86) PCT No.: PCT/EP2020/076517
§ 371 (c)(1),
(2) Date: Mar. 25, 2022

(87) PCT Pub. No.: WO2021/058531
PCT Pub. Date: Apr. 1, 2021

(65) Prior Publication Data
US 2022/0332395 A1 Oct. 20, 2022

(30) Foreign Application Priority Data

| Sep. 25, 2019 | (NO) | 20191156 |
| Oct. 2, 2019 | (NO) | 20191179 |
| Jul. 10, 2020 | (NO) | 20200815 |

(51) Int. Cl.
*B63B 35/44* (2006.01)
*B63B 1/12* (2006.01)
*F03D 13/25* (2016.01)

(52) U.S. Cl.
CPC .............. *B63B 35/44* (2013.01); *B63B 1/125* (2013.01); *F03D 13/25* (2016.05); *B63B 2035/446* (2013.01); *F05B 2240/93* (2013.01)

(58) Field of Classification Search
CPC .......... B63B 35/44; B63B 1/125; F03D 13/25
See application file for complete search history.

(56) References Cited

U.S. PATENT DOCUMENTS

| 9,533,738 B2 | 1/2017 | Tominaga |
| 10,215,161 B2 | 2/2019 | Viselli et al. |

(Continued)

FOREIGN PATENT DOCUMENTS

| CL | 2017001942 A1 | 4/2018 |
| CN | 104619984 A | 5/2015 |

(Continued)

OTHER PUBLICATIONS

Office Action issued in counterpart Chilean Patent Application No. 202200606 mailed on Jun. 10, 2023 (20 pages).

(Continued)

*Primary Examiner* — S. Joseph Morano
*Assistant Examiner* — Jovon E Hayes
(74) *Attorney, Agent, or Firm* — Osha Bergman Watanabe & Burton LLP

(57) ABSTRACT

A floating metal platform for supporting an offshore installation includes three elongated elements. Each elongated element includes a first elongated member; a second elongated member parallel to the first elongated member; and at least a first buoyancy element connected to the first elongated member and the second elongated member. Each elongated element has a first end and an opposite second end. One of the first end or the second end of each of the elongated elements is connected to one of the first end or the second end of at least one of the other elongated elements. A floating wind turbine includes the floating metal platform; a tower connected to the platform; and a horizontal axis wind turbine connected to the tower.

17 Claims, 18 Drawing Sheets

(56) References Cited

U.S. PATENT DOCUMENTS

| | | | | |
|---|---|---|---|---|
| 2012/0103244 A1* | 5/2012 | Gong | ................... | B63B 35/44 |
| | | | | 114/265 |
| 2013/0019792 A1* | 1/2013 | Jahnig | ..................... | B63B 3/04 |
| | | | | 114/267 |
| 2015/0329180 A1* | 11/2015 | Tominaga | ............... | B63B 35/44 |
| | | | | 114/267 |
| 2016/0195070 A1 | 7/2016 | Li et al. | | |
| 2016/0230746 A1 | 8/2016 | Dagher et al. | | |
| 2016/0369780 A1* | 12/2016 | Aubault | ................. | B63B 1/107 |
| 2019/0263477 A1* | 8/2019 | Dagher | .................... | B63B 7/04 |

FOREIGN PATENT DOCUMENTS

| | | | |
|---|---|---|---|
| CN | 105793563 A | 7/2016 | |
| CN | 106103983 A | 11/2016 | |
| CN | 108757336 A | 11/2018 | |
| CN | 109026551 A | 12/2018 | |
| GB | 2365385 A | 2/2002 | |
| JP | 2013141857 A | 7/2013 | |
| JP | 2015180823 A | 10/2015 | |
| JP | 2017505262 A | 2/2017 | |
| JP | 2019104420 A | 6/2019 | |
| WO | 2007/096680 A1 | 8/2007 | |
| WO | 2009131826 A2 | 10/2009 | |
| WO | 2012/061710 A2 | 5/2012 | |
| WO | 2015120229 A1 | 8/2015 | |
| WO | 2016/172149 A1 | 10/2016 | |
| WO | 2019/106283 A1 | 6/2019 | |
| WO | 2019/143283 A1 | 7/2019 | |

OTHER PUBLICATIONS

Office Action issued in Japanese Application No. 2022-518683; Dated May 29, 2024 (11 pages).
International Search Report issued in PCT/EP2020/076517 on Jan. 15, 2021 (5 pages).
Written Opinion of the International Searching Authority issued in PCT/EP2020/076517 on Jan. 15, 2021 (9 pages).
Norwegian Search Report issued in No. 20191156 mailed on Apr. 27, 2020 (2 pages).
Norwegian Search Report issued in No. 20191179 mailed on May 2, 2020 (2 pages).
Norwegian Search Report issued in No. 20200815 mailed on Sep. 15, 2020 (2 pages).
Chinese Search Report issued in Chinese Application No. 202080067069X, mailed on Sep. 16, 2023 (3 pages).

* cited by examiner

FLOATING METAL PLATFORM

TECHNICAL FIELD

The present invention relates to floating metal platforms, in particular a floating wind turbine metal platform.

BACKGROUND

When studying designs of floating offshore platforms employed in various marine projects, structural efficiency in terms of weight and shape in terms of motion characteristics clearly stands out as design drivers for most successful units. This design practice has been transferred to multi-unit applications such as floating offshore wind farms while the practice emerged for single- or few unit projects in a different economic climate. Now the economical margins are much lower, and number of units have increase manifold. The first principles of design should be revisited, and it has been found that the prior art structural design drivers for floating offshore platforms, should not be the governing performance indicator for say an offshore wind platform in today's supply market. Instead the design should adhere to requirements such as supply chain availability, fabrication and installation logistics as well as engineering simplicity. Therefore, simplicity should take priority over sophistication in design to the expense of weight and motion characteristics. Complex structures with non-linear excitation and response have an associated uncertainty on structural capacity that from an investors point of view translates to an unquantifiable risk which he must offset against a considerable experience-based contingency. By utilizing state-of-the art knowledge of motion characteristics the designer should simplify the structure to linearize the motion characteristics as much as possible. This will increase the accuracy of the structural capacity estimates to such a level that reliability-based performance estimates become practically available. Such estimates will improve the investors risk-understanding significantly and enable investment decisions shift from qualitative to quantitative estimates of contingency.

It has been found that emphasizing existing state-of-the-art mass-production technology including modern logistical principles in design will reduce the supply chain maturation period, favour automation and thereby significantly reduce manufacturing cost. This limits the designer's choice in geometrical shapes and complexity which must be carefully weighed against automation friendliness and logistic in assembly and storage.

Prior art semisubmersible wind turbine platforms rely on either concrete or stiffened shell floating bodies located at the structural perimeter that is joined to the centre by either concrete elements or truss work. Such reinforced concrete, truss work from tubular members and stiffened shells are labour intensive and challenging to fabricate by automated mass production.

The design philosophy of the invention redefines the design drivers for floating support structures for offshore wind. Previous art relies on generic methods conceived during the pioneer era of the offshore oil and gas industry. While these methods are sophisticated and allow for high structural optimization with respect to weight and motion, they do not address the fundamental challenges in floating offshore wind. Unlike Oil & Gas, where a field development project involves one to a few units with excessive profit margins, the renewable energy market for support structures is low margin, but the number of units per project are high. This realization dictates a reformulation of design drivers where now focus should be shifted from optimization of weight and motion to utilizing the high numbers to achieve cost reduction. A design and production process where this historically are successfully accomplished is within automated serial production; and the efficiency of such serial production process is governed by the serial production friendliness of the unit to be fabricated. However serial production friendliness is not enough. Experience show that quite a few, if not all, initiatives with serial production of units in offshore wind has stranded on the substantial up-front cost of procuring a fully functional large unit production line with the associated logistics capacity. If one dissects why investors (including fabricators and developers) are reluctant to take such investments in offshore wind a common denominator is the lack of a healthy market to offset the up-front cost.

The following two premises is found to be fundamental to the floating offshore wind industry:

A successful floating offshore wind market is dependent on the availability of fit for purpose automated serial production facilities.

The existence of automated serial production facilities for offshore wind rely on a mature predictable market.

These two premises are however mutually exclusive and in fact apparently paradoxical due to their interdependence. Yet the interdependence of the premises can be weakened by carefully formulating a bridging technology between existing serial production capability and a commercially viable floating offshore wind technology.

The existing serial production capability that is identified as sufficiently mature is the monopile technology. It is by far the most successful foundation concept in fixed structure offshore wind. The monopile suppliers have honed their skills over more than a decade, has an impressive throughput as well a true serial production mindset.

The market for monopile technology is however declining due to new sites located at larger water depths where the monopile no longer is feasible. Monopile fabricators need an enabler to make the transition to floating wind.

The intersection between these needs and premises, the bridging technology, is the concept emerging from the invention design philosophy. The invention satisfies the serial production friendliness requirement and can be produced with minimal changes to the production line at the monopile manufacturers. That means that the biggest hurdle, the big up-front investment, is circumvented.

For the invention to fit within the serial production requirement of the monopile manufacturers the columns must be made substantially of steel. While the column walls of the invention may be sandwich elements with steel surface and concrete core, they will never be reinforced concrete as found in typical concrete structure floating bodies. There exists no automated large-scale process that suit such composite material.

Some prior art platforms are described in:
GB 2365385 A;
US 2012/103244 A1; and
US 2013/019792 A1.

An objective of the present invention is to provide a floating metal platform which is more suited for mass-production than the prior art wind platforms.

SUMMARY OF THE INVENTION

The invention relates to a floating metal platform, a wind turbine and a method for assembling a floating metal platform as set forth in the independent claims. Preferred embodiments are set forth in the dependent claims.

Variations of prior art use concrete extensively in their structures, however recently the environmental impact from concrete has taken focus and is deemed to become a less attractive material in the future. The basic material of the invention is steel, while concrete is optional.

It is described a floating metal platform for supporting an offshore installation, wherein the platform comprises at least three elongated elements, wherein each elongated element comprises: a first elongated member; a second elongated member parallel to the first elongated member; and at least a first buoyancy element connected to the first elongated member and the second elongated member. Each elongated element has a first end and an opposite second end. One of the first end or the second end of each of the elongated elements is connected to one of the first end or the second end of at least one of the other elongated elements.

Connected is to be construed as directly or indirectly connected, e.g. via an intermediate part.

It is achieved a floating metal platform which is suited for mass-production, in particular a floating metal platform which is suited for mass-production by means of readily available production facilities.

The floating metal platform may be constructed without the use of concrete.

The floating metal platform may be completely constructed by metal. Steel and aluminium are examples of preferred metals.

The first and second elongated elements may be vertically aligned, horizontally aligned, or something therebetween.

The first elongated member may comprise a first end portion, a second opposite end portion and therebetween an intermediate portion. The second elongated member may comprise a first end portion, a second opposite end portion and therebetween an intermediate portion. At least the first buoyancy element may be connected to the intermediate portions of the first elongated member and the second elongated member.

An advantage of this configuration is that instead of using the elongated elements to connect the buoyancy elements, the buoyancy elements are incorporated into the elongated elements, i.e. used as a structural element in addition to providing buoyancy. The buoyancy elements may thus at least partly provide the required stiffness to the elongated elements, which in turn provides the stiffness of the floating platform.

Another advantage is that the buoyancy elements can be distributed more evenly along the elongated element instead of only being positioned at each end.

The elongated element may be self-supporting.

Each elongated element may comprise a plurality of buoyancy elements. One buoyancy element may be connected to the first end portions of the first and second elongated members. One buoyancy element may be connected to the second end portions of the first and second elongated members. Two connected elongated elements may have one common buoyancy element. A plurality of buoyancy elements may be connected to the intermediate portions of the first and second elongated members.

The first buoyancy element may comprise a first end surface and an opposite second end surface. The first elongated member may be connected to the first end surface of the first buoyancy element, and the second elongated member may be connected to the second end surface of the first buoyancy element.

An advantage of this configuration is that a more compact construction can be achieved.

The elongated member may be a pipe, a plate, a curved plate, a stiffened plate, a sandwich structure, have a corrugated cross-section or a sheet piling cross-section.

The offshore installation may be a renewable energy installation, a mining installation, a food production installation, a desalination installation or a hydrocarbon production installation.

The offshore installation may be a wind turbine, a wave energy converter, a solar panel, an aqua culture or a building.

The elongated elements may be arranged in the same plane.

Each elongated element may further comprise: a third elongated member parallel to the first and second elongated members, and a second buoyancy element connected to the second elongated member and the third elongated member.

The first buoyancy element and the second buoyancy element (114b) are connected to opposite sides of the second elongated member (112) and arranged in alignment with each other.

The first buoyancy element and the second buoyancy element may be connected to opposite sides of the second elongated member and arranged in misalignment with each other.

Each elongated element may further comprise stiffening means for stiffening of parallel elongated members.

At least one buoyancy element may be cylinder-shaped. If cylinder-shaped, buoyancy elements will have a centre axis. The elongated elements may be arranged such that the centre axis of the buoyancy element points substantially in the vertical direction when the platform is floating in a body of water. Alternatively, the elongated element may be oriented such that the centre axis of the buoyancy element points substantially in the horizontal direction when the platform is floating in a body of water. Alternatively, the elongated element may be oriented such that the centre axis of the buoyancy element points in an arbitrary direction when the platform is floating in a body of water.

The at least one buoyancy element may comprise: an outer liner, an inner liner concentric to the outer liner and having a smaller diameter than the outer liner, an annulus between the outer liner and the inner liner. The annulus may be filled with concrete.

The at least one buoyancy element may have a planar interfaces with at least two of the first elongated member, the second elongated member and/or the third elongated member.

The platform may comprise a centre hub. The elongated elements may be connected to the centre hub and arranged with regular angular spacing.

It is described a floating wind turbine. The floating wind turbine may comprise: the metal platform as described herein, a tower connected to the platform, and a horizontal axis wind turbine connected to the tower.

The metal platform may comprise a centre hub having a centre axis, and the tower may extend along the centre axis.

The floating wind turbine may further comprise stay cables having first ends connected to the elongated elements and second ends connected to the tower.

The floating wind turbine may further comprise a central column connected to the platform extending in an opposite direction of the tower and preferably arranged concentric with the tower.

The floating wind turbine may further comprise stay cables having first ends connected to the elongated elements and second ends connected to the central column.

It is described a method for assembling a floating metal platform. The method comprises the steps of: providing at least three elongated elements, each having a first end and an opposite second end, by connecting at least a first buoyancy element to an elongated first member and an elongated second member parallel to the first elongated member; and connecting one of the first end or the second end of each of the elongated elements to one of the first end or the second end of at least one of the other elongated elements.

The first elongated member may comprise a first end portion, a second opposite end portion and therebetween an intermediate portion. The second elongated member may comprise a first end portion, a second opposite end portion and therebetween an intermediate portion. The method may comprise the step of connecting at least the first buoyancy element to the intermediate portions of the first elongated member and the second elongated member.

The step of providing an elongated element may further comprise connecting at least a second buoyancy element to the second elongated member and a third elongated member parallel to the first and second elongated members.

The method may further comprise the step of stiffening two parallel elongated members using stiffening means connected to said elongated members.

The method may further comprise the steps of: providing a centre hub connectable to at least three elongated elements; and connecting one of the first end or the second end of each of the elongated elements to one of the first end or the second end of at least one of the other elongated elements via the centre hub.

It is described a floating wind turbine metal platform, wherein the platform comprises: a centre hub; and at least three elongated elements connected to the centre hub, said elongated elements being arranged in the same plane with regular angular spacing, and each elongated element comprises: a first elongated member; a second elongated member parallel to the first elongated member; and at least one buoyancy element connected to the first elongated member and the second elongated member.

It is achieved a floating platform which is suited for mass-production, in particular a floating platform which is suited for mass-production by means of readily available production facilities.

The floating platform may be constructed without the use of concrete.

The floating platform may be completely constructed by metal. Steel and aluminium are examples of preferred metals.

If three elongated elements are connected to the centre hub, the angular spacing between neighbouring elongated elements may be 120 degrees. If four elongated elements are connected to the centre hub, the angular spacing between neighbouring elongated elements may be 90 degrees. If five elongated elements are connected to the centre hub, the angular spacing between neighbouring elongated elements may be 72 degrees. If six elongated elements are connected to the centre hub, the angular spacing between neighbouring elongated elements may be 60 degrees.

The centre hub may comprise attaching means for connecting to the elongated elements, such as a bolted interface. Alternatively, the centre hub and the elongated elements may be welded together.

The centre hub may comprise a body, which can be a hollow body with one or several open ends. The body may be cylinder-shaped and have a vertically oriented centre axis. Alternatively, instead of a circular cross-section, the hollow body may have a polygonal cross-section. The body may be a buoyancy element. The body may be suitable for connecting to a wind turbine tower.

The centre hub may comprise flanges suitable for connecting to the elongated members of the elongated element. Such flanges may be connected to the body of the centre hub.

The elongated elements of a platform may have the same size; however, the elongated elements of a platform may also have different sizes.

Mooring supports may be provided on the elongated elements, typically at the end of the elongated elements.

The elongated member may be any extruded member, a rolled member, a pipe, or a plate with or without stiffeners. Some stiffeners which may be used are e.g. flat stiffener, angle stiffener, tee stiffener (e.g. H-beam or I-beam), box stiffener, box stiffener, bulb flat stiffener, riveted angle stiffener, single side sided stiffener, double sided stiffener and multi-leg stiffener. The elongated member may also be a laminated structure. The elongated member may have a sandwich structure, e.g. two layers of metal with an intermediate layer of concrete.

The elongated member will typically define the length and width of the elongated element.

The buoyancy elements may typically be hollow bodies. Alternatively, the buoyancy elements may be massive bodies with lower density than seawater.

The buoyancy elements may comprise ballasting means. It is thus achieved improved stability of the platform. It is thus achieved adjustability of the dynamic properties of the platform. It may thus be achieved a low draft, e.g. during transport inshore or at quay. The ballasting means enables raising of the turbine during fabrication.

The buoyancy elements of an elongated element may have different shapes. The width of the buoyancy element may be different from the width of the elongated member.

In an aspect, each elongated element may further comprise: a third elongated member parallel to the first and second elongated members; and at least one buoyancy element connected to the second elongated member and the third elongated member.

Such multi layered elongated element configurations will enhance scalability and reduce the need for stiffening means by overlapping the buoyancy elements between the layers.

At least one of the buoyancy elements connected to the first elongated member and the second elongated member may be arranged at a distance from the centre hub different than a distance from the centre hub to any of the buoyancy elements connected to the second elongated member and the third elongated member.

The buoyancy elements connected to the first elongated member and the second elongated member and the buoyancy elements connected to the second elongated member and the third elongated member may be arranged by pairs at corresponding distances from the centre hub.

The distribution of the buoyancy elements within an elongated element will affect the strength and stability of the elongated element.

Each elongated element may further comprise stiffening means for stiffening of parallel elongated members.

In this way the strength and stability of the elongated element may be further improved.

The stiffening means may be mechanically fastened or welded to the structure. Examples of means for mechanically fastening are anchor and shoe, bolts and nuts, screws, nails, rivets, glue, tongue and groove.

Said stiffening means may be pre-tensioned to any required value or alternatively not pre-tensioned at all.

Said stiffening means may balance the discontinued vertical shear in the gap between the buoyancy elements. Said stiffening means may be arranged such that they pairwise substantially form an X-shape. Said X-shaped pairwise stiffening means will when pre-tensioned exercise forces on the elongated members and buoyancy elements. Said forces will be balanced by compression in the first elongated member, the second elongated member and buoyancy elements. When configured adequately, the first principal stress tensor substantially normal to the weld, can be designed to be compressive in most of the dynamic range and significantly improve fatigue performance.

Alternatively, the stiffening means may be arranged singly.

Stiffening may be achieved by stiffening means such as pre-tensioned cables, strands, rods, bars, tubulars or other beam cross sections connecting between the elongated members. Stiffening may also be achieved by additional stiffeners included in the elongated members.

The buoyancy elements may be cylinder-shaped.

The buoyancy elements may comprise: an outer liner; an inner liner concentric to the outer liner and having a smaller diameter than the outer liner; and an annulus between the outer liner and the inner liner; wherein the annulus may be filled with concrete.

Such sandwich construction is well suited for mass-production.

The buoyancy elements may have planar interfaces with at least two of the first elongated member, the second elongated member and/or the third elongated member. It an elongated element comprises a plurality of elongated elements, the buoyancy elements of this elongated element may have planar interfaces with any of said elongated members.

It is described a floating wind turbine, wherein the floating wind turbine may comprise: a metal platform according to any aspect of the invention; a tower connected to the platform and extending along a centre axis of the centre hub of the platform; and a horizontal axis wind turbine connected to the tower.

The floating wind turbine may further comprise stay cables having first ends connected to the elongated elements and second ends connected to the tower.

The floating wind turbine may further comprise a central column connected to the platform extending in an opposite direction of the tower and preferably arranged concentric with the tower.

The floating wind turbine may further comprise stay cables having first ends connected to the elongated elements and second ends connected to the central column.

The floating wind turbine may be used offshore. The floating wind turbine may be a columns-stabilized unit, a semi-submergible, a spar design or any combination of these.

It is described a method for assembling a floating wind turbine metal platform, wherein the method comprises the steps of: providing an elongated element by connecting at least one buoyancy element to an elongated first member and an elongated second member parallel to the first elongated member; providing a centre hub connectable to at least three elongated elements; and connecting at least three elongated elements to the centre hub.

The step of providing an elongated element may further comprise connecting at least one buoyancy element to the elongated second member and an elongated third member parallel to the first and second elongated members.

The method may further comprise the step of pre-tensioning two parallel elongated members using stiffening means connected to said elongated members.

The floating platform doesn't require investments in new fabrication line. The so called monopile, tower or any other serial produced large diameter cylindrical steel element can be used as a buoyancy element directly. I.e. the invention transforms existing unrelated structural elements, the monopile, into new application.

The floating platform has a reduced structural complexity compared to prior art solutions, which increases fabrication yard availability.

The floating platform utilizes stiffened plates and simple stiffening means for structural strength instead of complex pontoon structures seen in prior art semi-submersibles.

The floating platform enables a high degree of automation during fabrication, which limits human hazardous exposure. It is foreseen that, as for O&G, the HSE focus in floating offshore wind will increase with time and "human free intervention" will become more and more attractive.

The invention will now be described in non-limiting embodiments and with reference to the attached drawings, wherein;

DETAILED DESCRIPTION

The Figures described above, and the written description of specific structures and functions below are not presented to limit the scope of what Applicant has invented or the scope of the appended claims. Rather, the Figures and written description are provided to teach any person skilled in the art to make and use the disclosures for which patent protection is sought. Those skilled in the art will appreciate that not all features of a commercial embodiment of the disclosures are described or shown for the sake of clarity and understanding. Persons of skill in this art will also appreciate that the development of an actual commercial embodiment incorporating aspects of the present disclosure will require numerous implementation-specific decisions to achieve the developer's goal for the commercial embodiment. Such implementation-specific decisions may include, and likely are not limited to, compliance with system related, business-related, government-related, and other constraints, which may vary by specific implementation, location and from time to time. While a developer's efforts might be complex and time-consuming in an absolute sense, such efforts would be, nevertheless, a routine undertaking for those of ordinary skill in this art having benefit of this disclosure. It must be understood that the disclosures disclosed and taught herein are susceptible to numerous and various modifications and alternative forms. The use of a singular term, such as, but not limited to, "a," is not intended as limiting of the number of items. Also, the use of relational terms, such as, but not limited to, "upper," "lower," "left," "right," "upper," "lower," "down," "up," "side," and the like are used in the written description for clarity in specific reference to the Figures and are not intended to limit the scope of the disclosure or the appended claims.

The present disclosure provides an improved design for a floating column stabilized platform. Embodiments according to the disclosure will now be described in detail with reference to the accompanying drawings.

Figure 10:
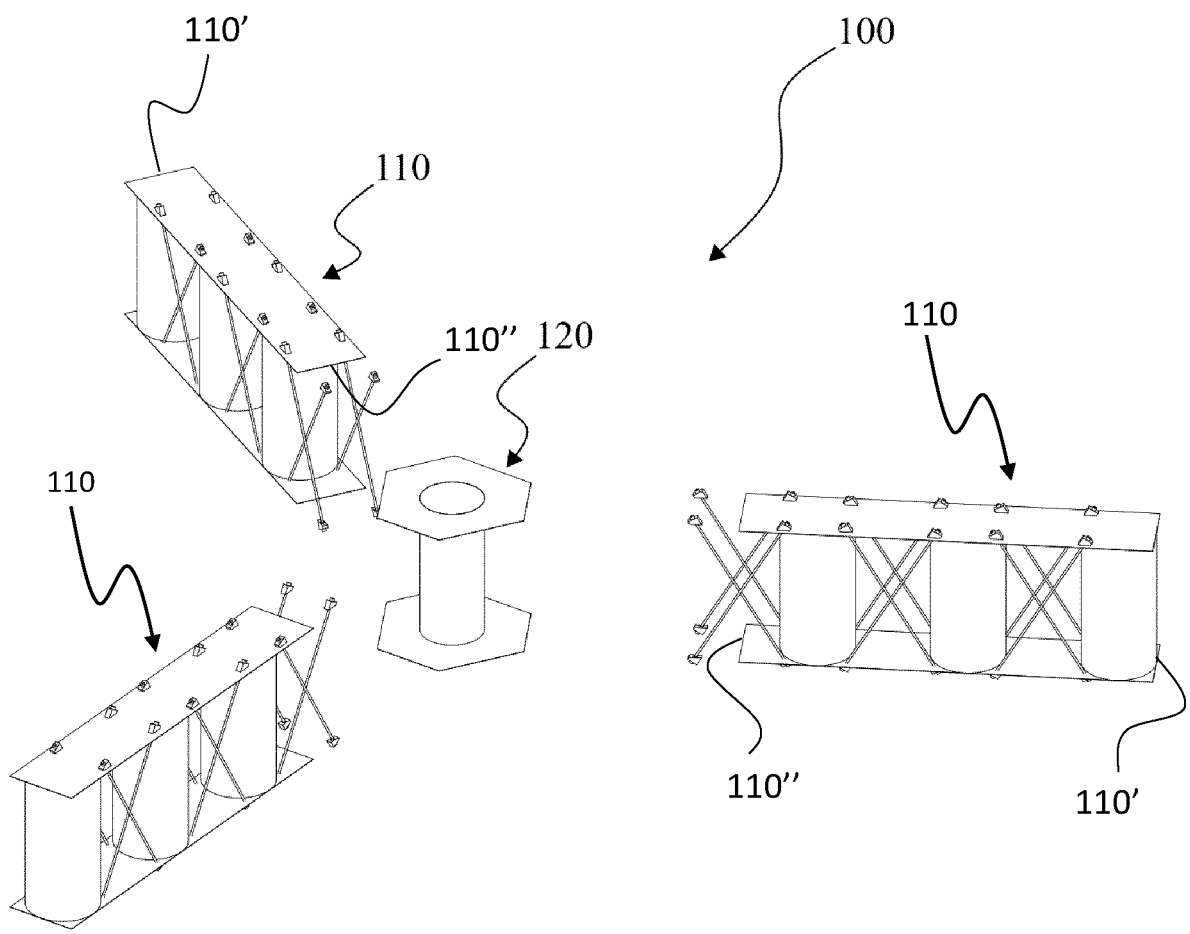
FIG. 10 shows an exploded view of a wind turbine platform comprising a central hub and elongated bodies.

FIG. 10 shows an exploded perspective view of a floating wind turbine platform 100 is shown. The floating wind turbine platform 100 may comprise three elongated elements 110 connected to a central hub 120.

Figure 1:
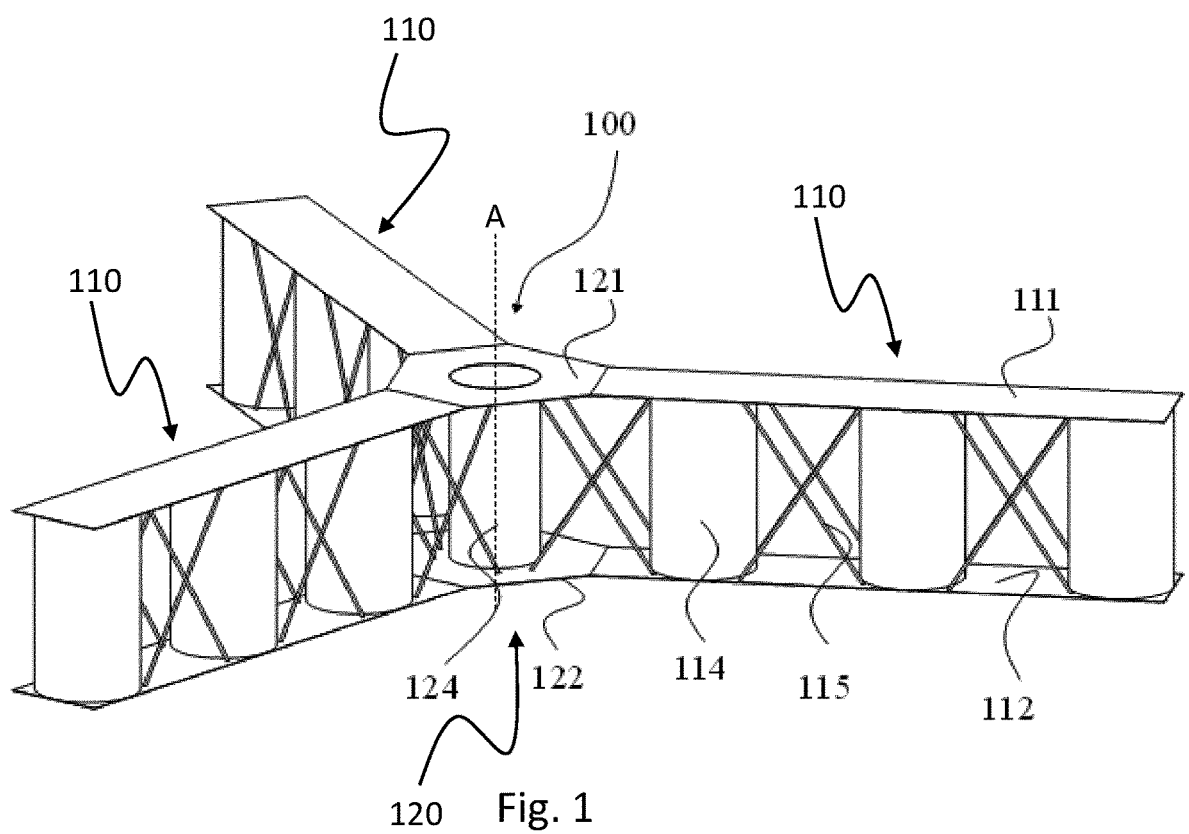
FIG. 1 shows an isometric projection of a wind turbine platform.

FIG. 1 shows a schematic perspective view of a floating wind turbine platform 100. The floating wind turbine platform 100 may comprise three elongated elements 110 connected to a central hub 120. Each elongated element 110 may comprises three buoyancy elements 114 arranged between a first elongated member 111 and a second elongated member 112. Stiffening means 115 may be connected to the first elongated member 111 and a second elongated member 112 between the buoyancy element 114. Said central hub 120 may comprise a first flange 121 and a second flange 122 which may connect to the first elongated member 111 and the second elongated member 112 respectively, joining the elongated elements 110 with the central hub 120. Said central hub 120 may also comprise a body 124 connected to the first flange 121 and the second flange 122.

Figure 2:
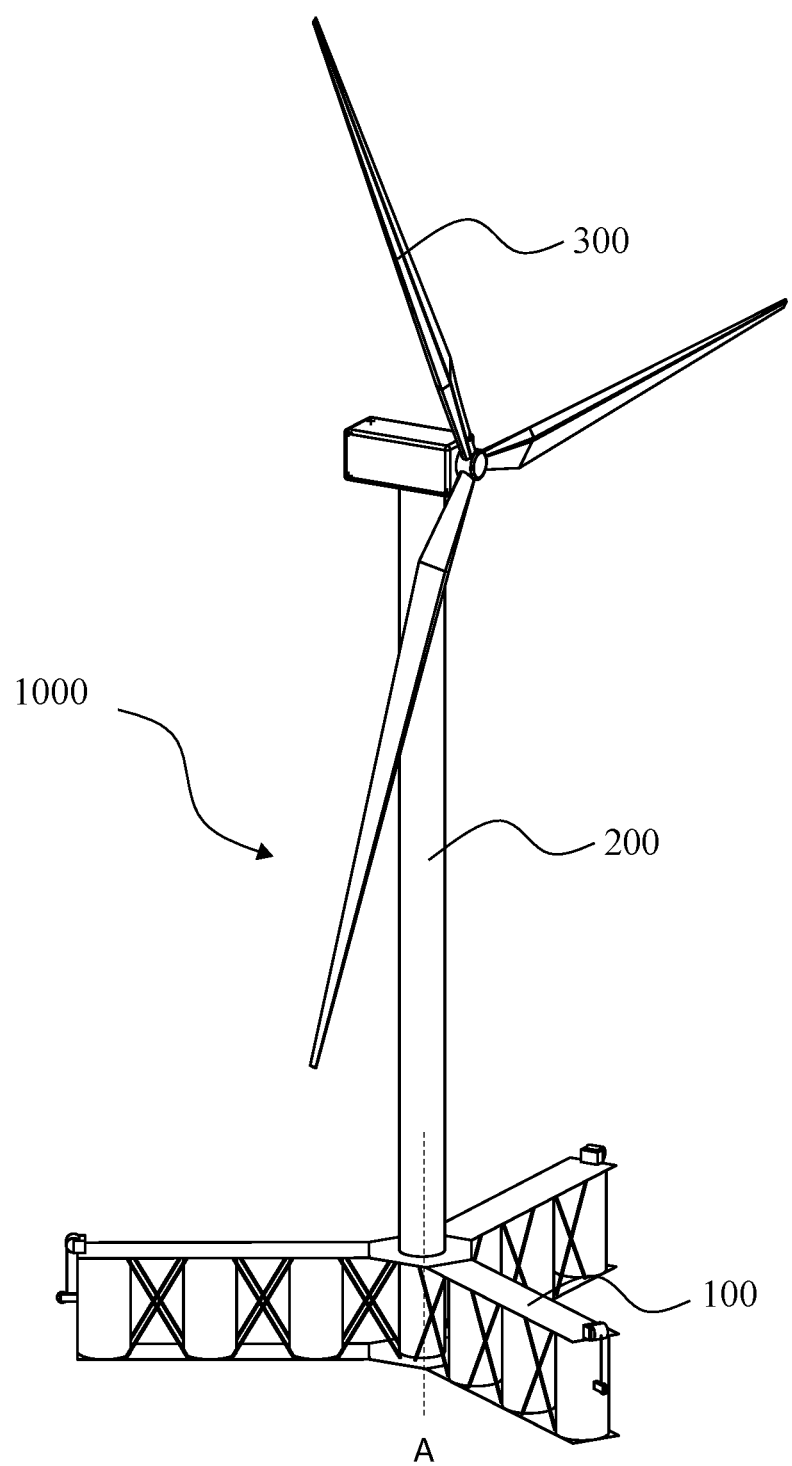
FIG. 2 shows an isometric projection of a wind turbine comprising a wind turbine platform, a tower and a horizontal axis turbine.

FIG. 2 illustrates a floating wind turbine 1000 comprising a floating wind turbine platform 100, a tower 200 and a horizontal axis wind turbine 300. As an alternative to the horizontal axis wind turbine 300, the floating wind turbine 1000 may comprise a vertical axis turbine (not illustrated).

Figure 3:
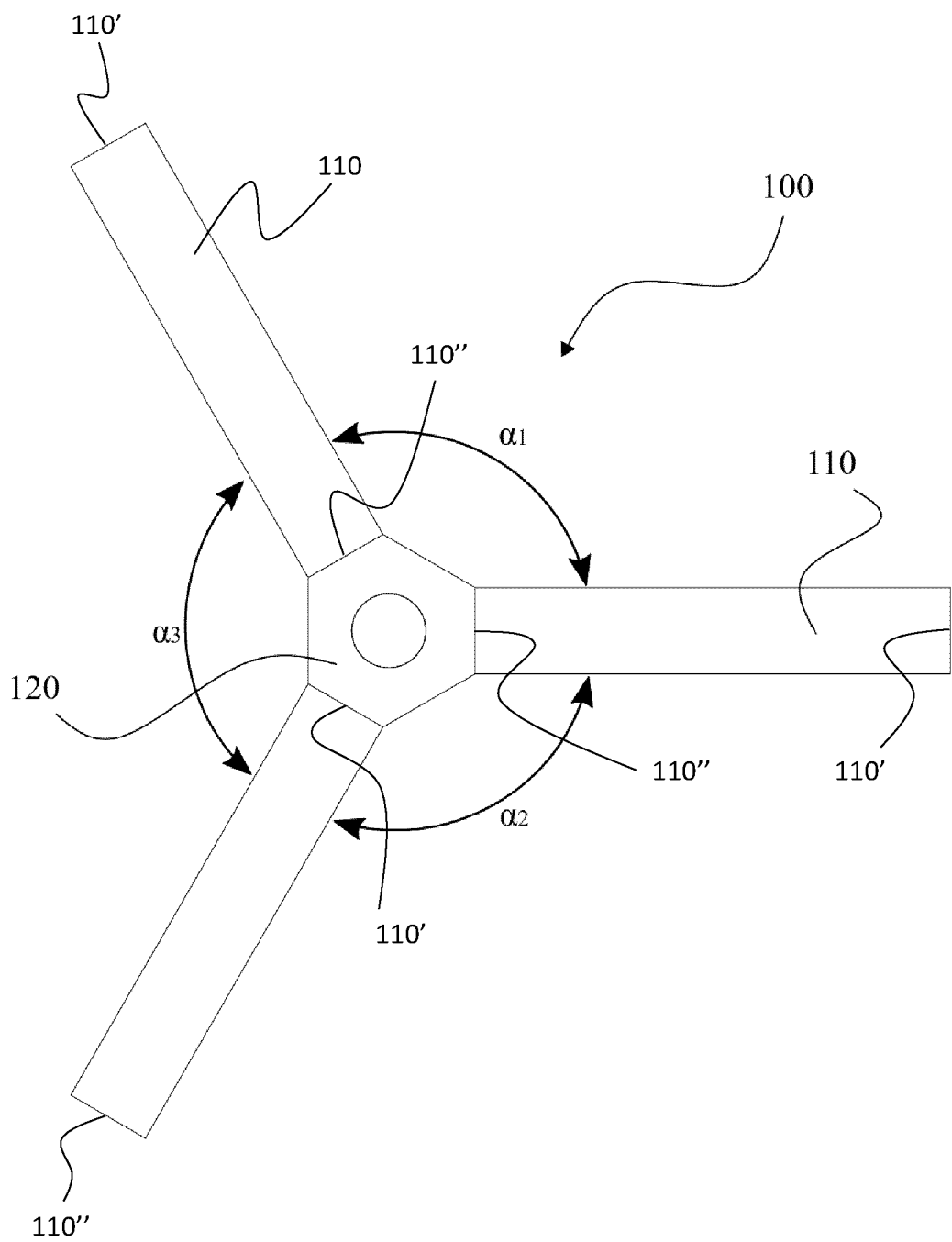
FIG. 3 shows a top view of a wind turbine platform comprising a centre hub and three elongated elements.

FIG. 3 shows a top view of a floating wind turbine platform 100, with angles $\alpha_1$, $\alpha_2$, $\alpha_3$ in the horizontal plane between the elongated elements 110. Said angles $\alpha_1$, $\alpha_2$, $\alpha_3$ may all be equal or alternatively all be different. Alternatively, the elongated elements 110 may be arranged with angles between them where $\alpha_1=\alpha_2>\alpha_3$ or $\alpha_1=\alpha_2<\alpha_3$. A skilled person would understand that similar angular distributions may also apply to platforms 100 with more than three elongated elements 110.

Figure 4:
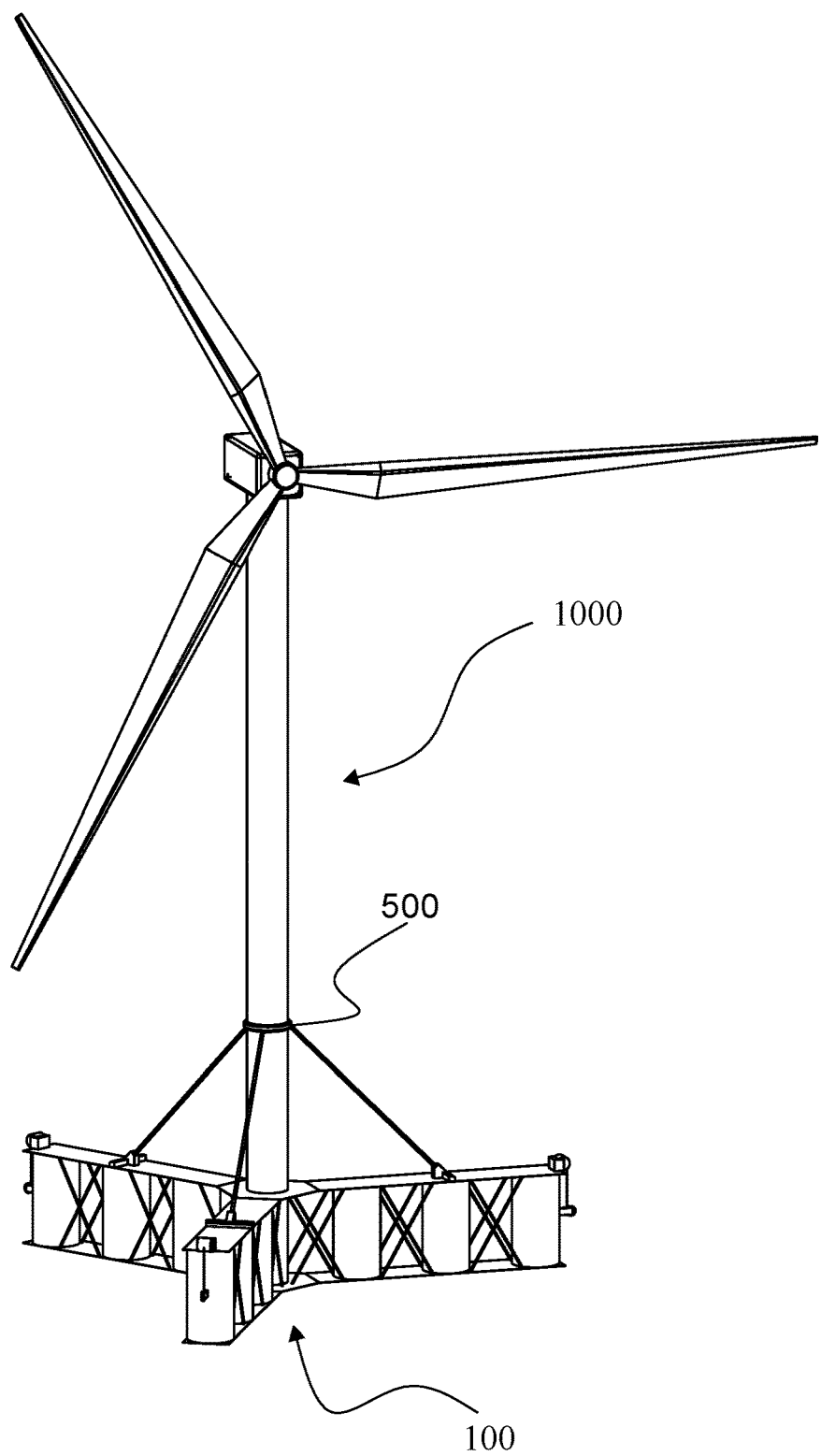
FIG. 4 shows an isometric projection of a wind turbine with a tower connected to a platform with stay wires.

FIG. 4 shows that a floating wind turbine 1000 may comprise stay cables 500 connected between the tower 200 and the floating wind turbine platform 100.

Figure 5:
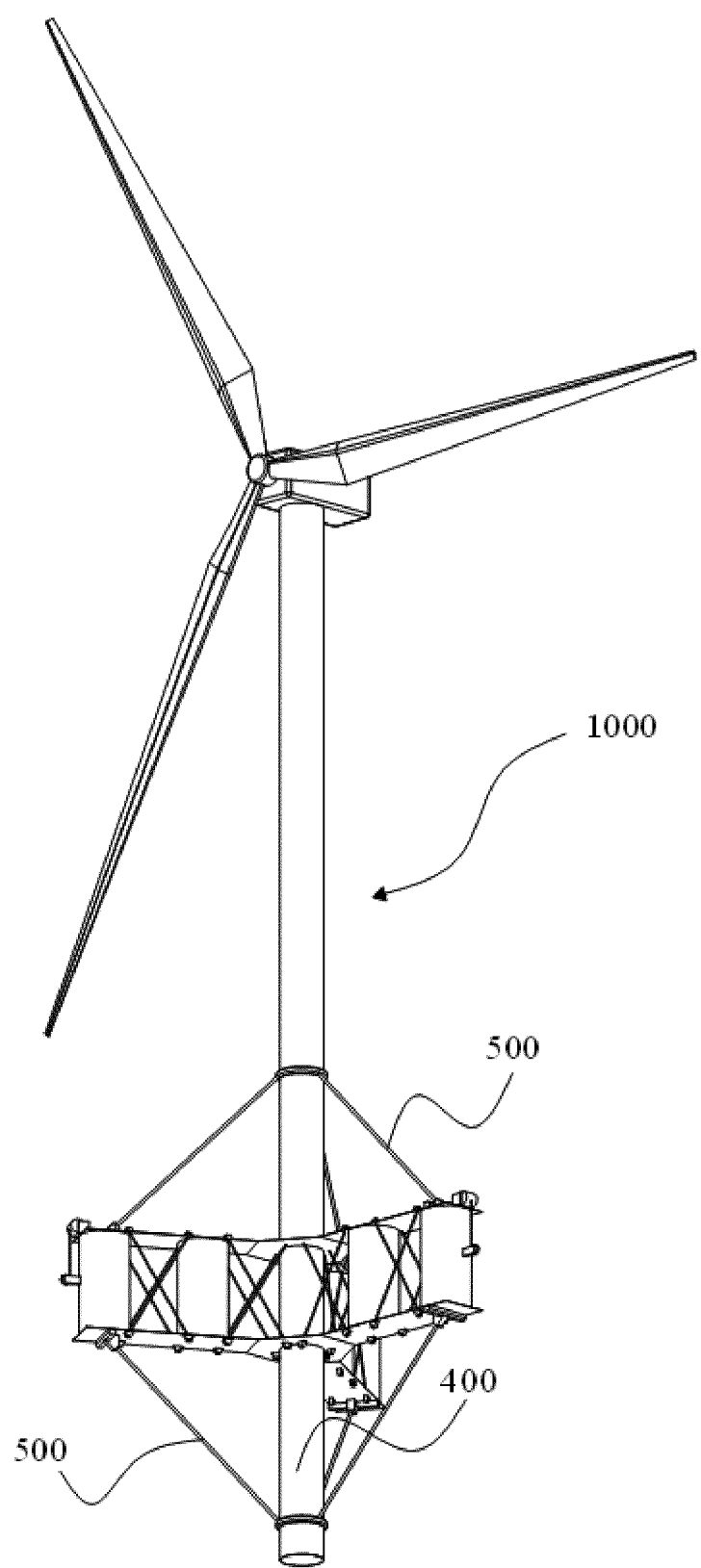
FIG. 5 shows an isometric projection of a wind turbine comprising a tower, a platform and a central column extended below a centre hub of the platform and stay wires from the central column to elongated elements of the platform as well as from the tower to the elongated elements.

FIG. 5 shows that a central column 400 may be extended below the floating wind turbine platform 100. Said extended central column 400 may be connected to the floating wind turbine platform 100 by means of stay cables 500. These lower stay cables 500 will balance the force from the upper stay cables 52 and form an equilibrium by triangle of forces.

Figure 6:
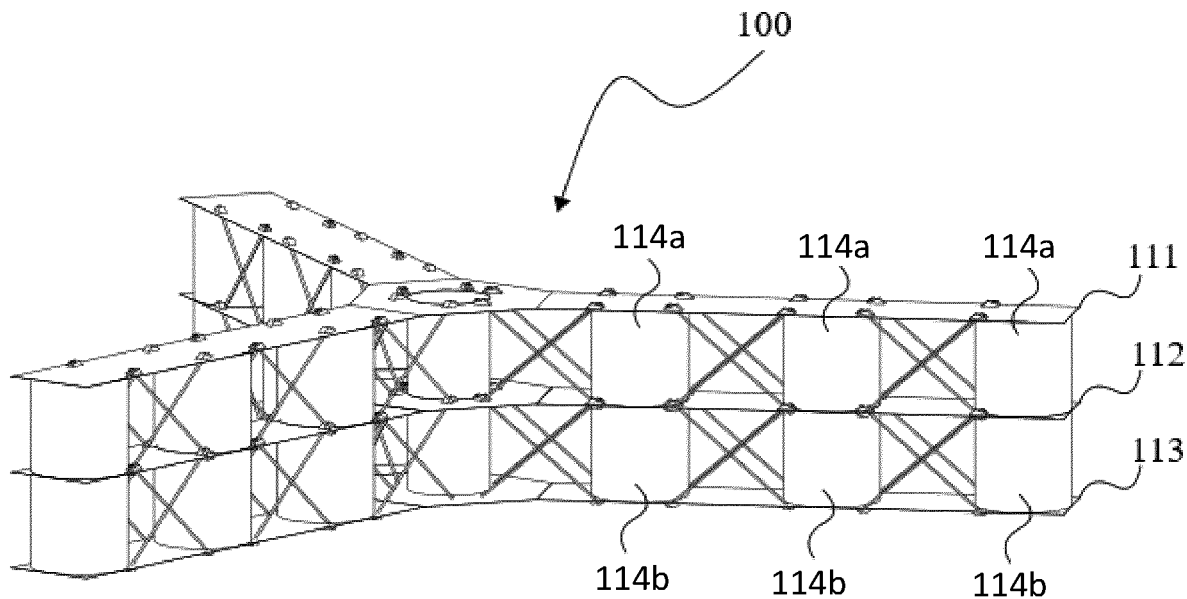
FIG. 6 shows an isometric projection of a wind turbine platform in a double layered elongated element configuration with gap stiffening system by stiffening means.

FIG. 6 shows a schematic perspective view of a floating wind turbine platform 100. The floating wind turbine platform 100 may comprise elongated elements 110 of a double layered elongated element 110 configuration connected to a centre hub 120. Each double layered elongated element 110 configuration may comprise two layers of three buoyancy elements 114a, 114b. The three first buoyancy elements 114a arranged in an upper-layer may be arranged between a first elongated member 111 and a second elongated member 112. The three second buoyancy elements 114b arranged in a lower-layer may be arranged between the second elongated member 112 and a third elongated member 113. Said three upper-layer first buoyancy elements 114a may substantially coincide with the three lower-layer second buoyancy elements 114b in the horizontal plane, as shown in FIG. 6.

Stiffening means 115 may be connected to the first elongated member 111 and the second elongated member 112, between the first buoyancy elements 114a. Stiffening means 115 may be connected to the second elongated member 112 and the third elongated member 113, between the second buoyancy elements 114b. Said centre hub 120 may comprise a first flange 121, a second flange 122 and a third flange 123 which may connect to the first elongated member 111, the second elongated member 112 and the third elongated member 113, respectively, joining the elongated element 110 with the centre hub 110. Said centre hub 120 may comprise a body 124 connected to the first flange 121, the second flange 122 and the third flange 123.

Figure 7:
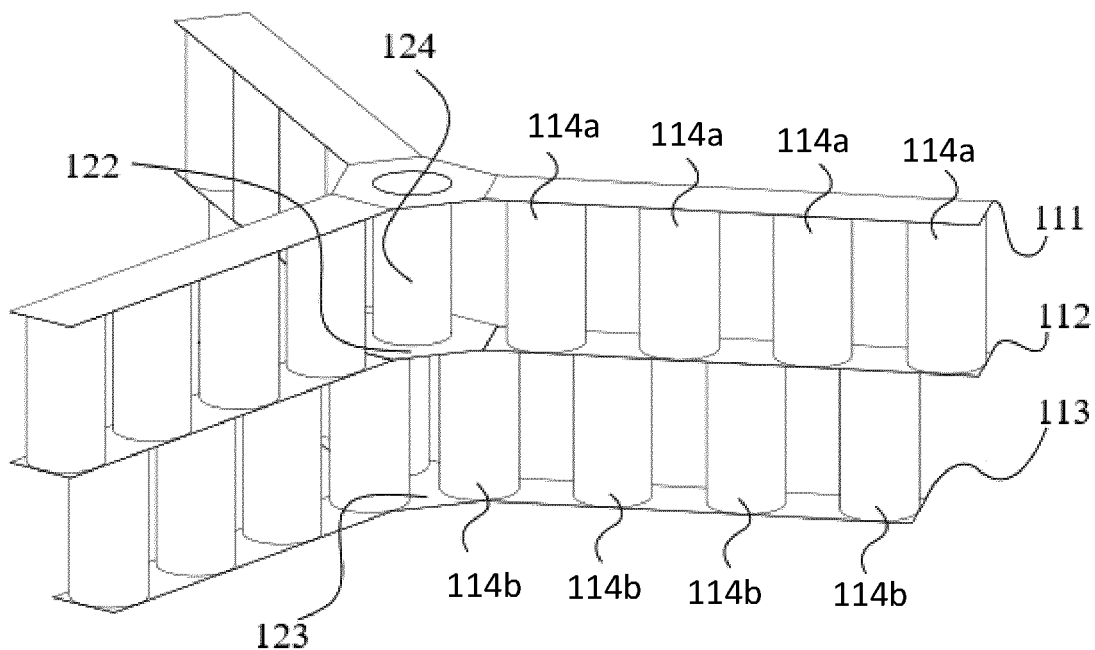
FIG. 7 shows an isometric projection of a wind turbine platform in a double layered elongated element configuration with gap stiffening system by overlapping buoyancy elements.

FIG. 7 shows a schematic perspective view of a floating wind turbine platform 100. The floating wind turbine platform 100 may comprise elongated elements 110 of a double layered elongated element 110 configuration which may be connected to a centre hub 120. Each double layered elongated element 110 configuration may comprise two layers of four buoyancy elements 114a, 114b. The four first buoyancy elements 114a arranged in an upper-layer may be arranged between a first elongated member 111 and a second elongated member 112. The four second buoyancy elements 114b arranged in a lower-layer may be arranged between the second elongated member 112 and a third elongated member 113. The inner second buoyancy element 114b may partly be arranged between the second elongated member 112 and a third elongated member 113, and partly arranged between a second flange 122 and a third flange 123 of the centre hub 120. Said four upper-layer first buoyancy elements 114a may substantially overlap the four lower-layer second buoyancy elements 114 in the horizontal plane, as shown in FIG. 7.

Said centre hub 120 may comprise a first flange 121, a second flange 122 and a third flange 123 which connects to the first elongated member 111, the second elongated member 112 and the third elongated member 113 of the elongated elements 110. The centre hub 120 may also comprise body 124 connected to the first flange 121 and the second flange 122.

The floating wind turbine platform 100 may comprise a centre hub 120. Said centre hub 120 may comprise flanges 121, 122, 123 which may connect to the elongated members 111, 112, 113 of the elongated elements 110, and a body 124 substantially connected to a tower 200. Said body may accommodate any required equipment, ballast and buoyancy as well as power cable housing, power cable exit to sea and mooring supports. Said body ensures adequate load transfer between the wind turbine tower and the elongated elements 110.

The elongated elements 110 are self-supporting structures, may comprise at least two buoyancy elements 114 which may be arranged between at least two elongated members 111, 112, 113. The buoyancy elements 114 may be welded to the elongated members 111, 112, 113. The disclosure provides an innovative design where the elongated element 110 balance structural continuity with transverse permeability in an automated manufacturing friendly design. This is achieved by alternating between buoyancy elements 114 and stiffened gaps along its longitudinal axis while strive for simple geometric forms such as cylinders, rectangular plates and rods in the design. The automated manufacturing friendly design, due to simple geometry, favour existing serial production facilities.

The floating wind turbine platform 100 may comprise at least three elongated elements 110.

The elongated elements 110 may have a single layered elongated element 110 configuration. The elongated elements 110 may also have a multi layered elongated element 110 configuration, wherein a plurality of elongated elements 110 are stack on top of each other with common intermediate elongated members 111, 112, 113. Additional layers of elongated elements 110 will enhance scalability and reduce the need for stiffening means by overlapping the buoyancy elements 114 between the layers.

The horizontal pattern formed by the individual horizontal arrangement of the buoyancy elements 114 in the elongated elements 110 may be one dimensional or two dimensional, regular or irregular. Regular patterns include the five 2D lattice types; square, rectangular, oblique, rhombic and hexagonal. FIG. 1 shows elongated elements 110 with a regular one-dimensional pattern.

Figure 8:
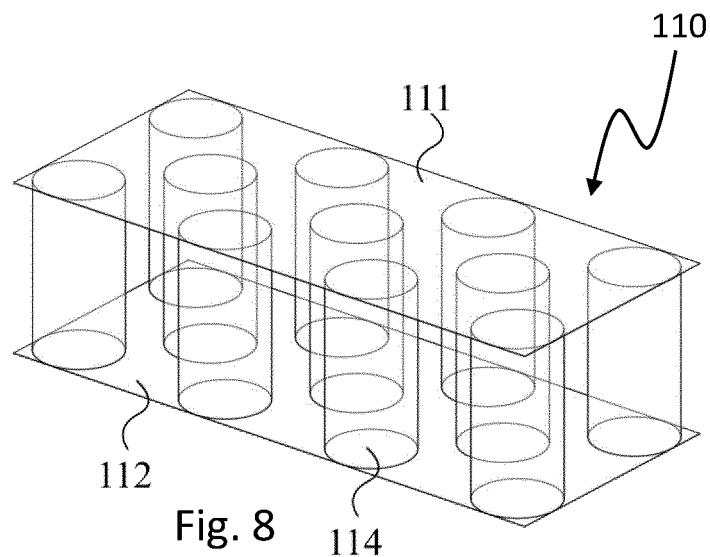
FIG. 8 shows an isometric projection of the elongated elements with buoyancy elements arranged in a horizontal triangular lattice.

FIG. 8 shows a regular two-dimensional pattern of hexagonal lattice type. Irregular patterns can be found in embodiments where the repeatability of the regular patterns is replaced by an arbitrary or random gap between the buoyancy elements 114.

The buoyancy elements 114 may have a dual purpose in providing buoyancy and piecewise structural strength for the elongated elements 110. The buoyancy elements 114 have simple geometries suited for automation on fabrication and assembly lines. The buoyancy elements 114 may be tailor-made to fit the capacity of the fabricator and they can be adapted to the current raw material market by balancing the use of metal and concrete.

The vertical cross section of a buoyancy element 114 may be straight, tapered or curved.

The horizontal cross section shape of a buoyancy element 114 may be selected from the group comprising of circle, oval, ellipse, curvilinear triangle, triangle, rectangle, kite, rhombus, pentagon, hexagon, heptagon, octagon, nonagon or decagon.

The buoyancy element 114 may be filled partially or fully with a ballast material. Said ballast material can comprise water, minerals and concrete.

The vertical walls of the buoyancy elements 114 of the elongated element 110 may be steel cylinders. The vertical walls of the buoyancy elements 114 of the elongated element 110 may also be a sandwich construction with a grout annulus 119 between an outer liner 117 and an inner liner 118, preferably made of steel. The vertical walls of the buoyancy elements 114 of the elongated element 110 may be steel walls comprising transverse/ring and axial stiffeners.

The first elongated member 111 and the second elongated member 112 may be joined with the buoyancy elements 114 to form a continuous structural element, namely the elongated element 110. The submerged elongated members 111, 112, 113 further introduce hydrodynamic loads on the system that can be tuned by changing the dimensions of said submerged elongated members 111, 112, 113 to aid in optimizing the overall motion characteristics of the floating wind turbine platform 110. Said elongated members 111, 112, 113 provide structural capacity in the radial direction that will balance radial forces and moments in substantially the vertical-radial plane.

To ensure scalability of the assembled units and provide robustness to changing markets conditions and supplier technology the elongated members 111, 112, 113 may have various embodiments. The elongated members 111, 112, 113 may e.g. be homogenous, sandwich constructions, unstiffened, stiffened, flat or curved.

In vertical-radial plane between two plates, for a single layer, single row configuration, the shear stiffness of the elongated elements 110 is discontinuous in the gap between the buoyancy elements 114. Said discontinuity can be mitigated with stiffening means 115 and/or an in-plate stiffening system.

Stiffening may be achieved by stiffening means 115 such as pre-tensioned cables, strands, rods, bars, tubulars or other beam cross sections connecting between the elongated members 111, 112, 113. Stiffening may also be achieved by additional stiffeners included in the elongated members 111, 112, 113.

This disclosure provides an innovative approach towards utilizing internal stresses due to stiffening means. With reference to FIG. 1, the floating wind turbine platform 100 may comprise thirty-six stiffening means 115. Said stiffening means may balance the discontinued vertical shear in the gap between the buoyancy elements 114. Said stiffening means 115 may be arranged such that they pairwise substantially form an X-shape. Said X-shaped pairwise stiffening means 115 will when pre-tensioned exercise forces on the elongated members 111, 112, 113 and buoyancy elements 114. Said forces will be balanced by compression in the first elongated member 111, the second elongated member 112 and buoyancy elements 114. When configured adequately, the first principal stress tensor substantially normal to the weld, can be designed to be compressive in most of the dynamic range and significantly improve fatigue performance.

Figure 9:
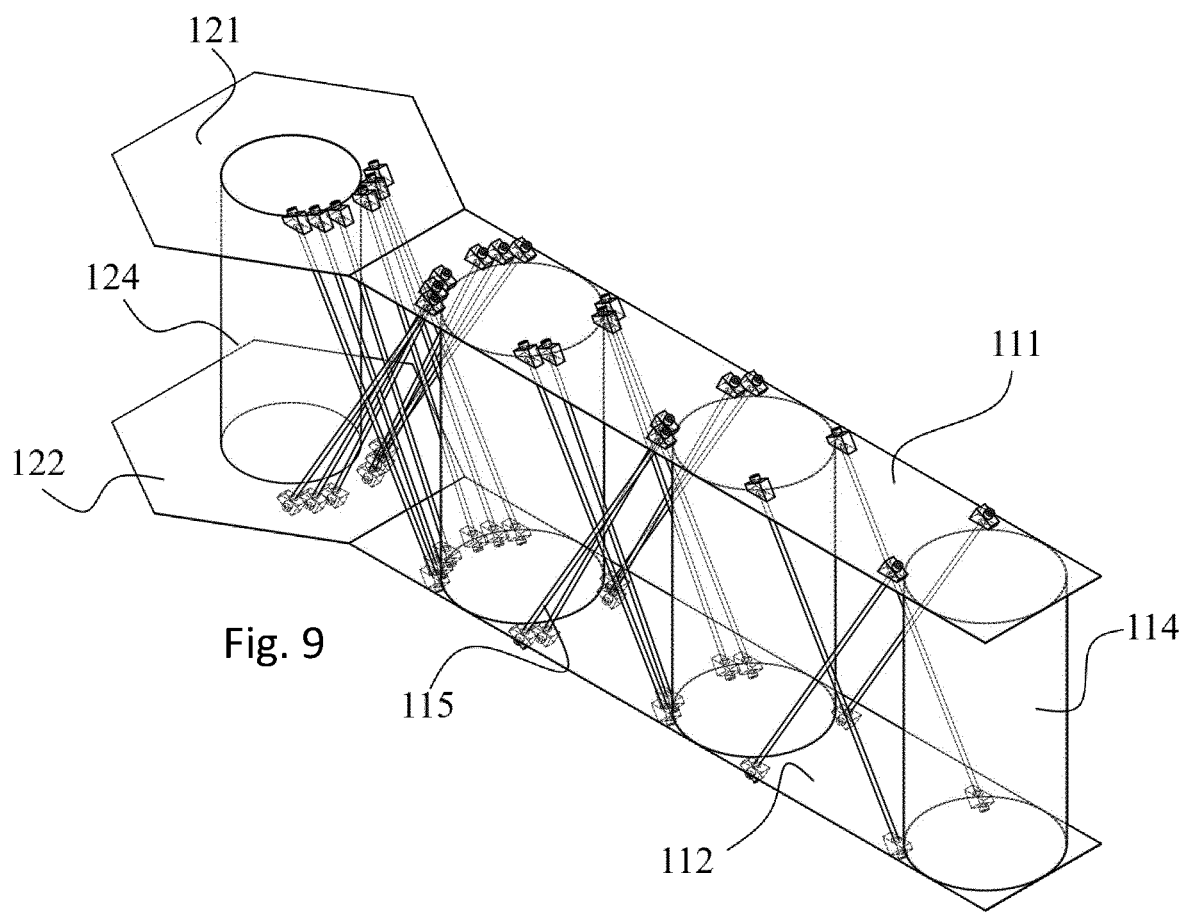
FIG. 9 shows an isometric projection of an elongated element with an alternative set of stiffening means.

FIG. 9 shows that a single elongated element 110 may comprise seventy-two stiffening means 115 for a three radials configuration with a radially decreasing distribution in numbers. Such decrease in outward numbers may be favourable over constant numbers because member thickness can be kept uniform throughout the structure.

Figure 11A:
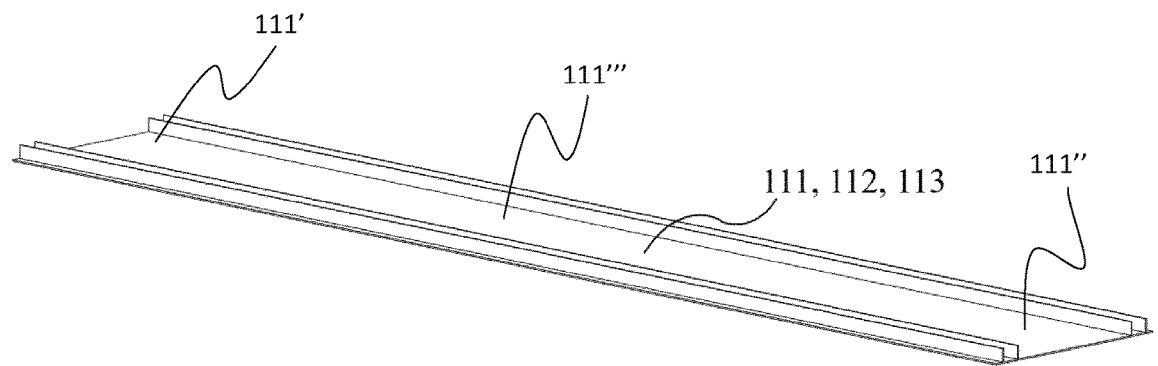
FIG. 11a-c shows an isometric projection of three different embodiments of an elongated member.
Figure 11B:
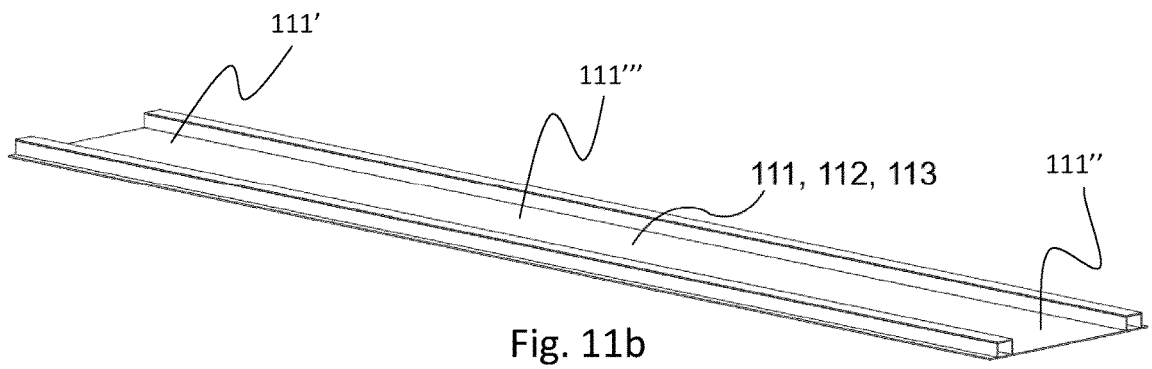
Figure 11C:
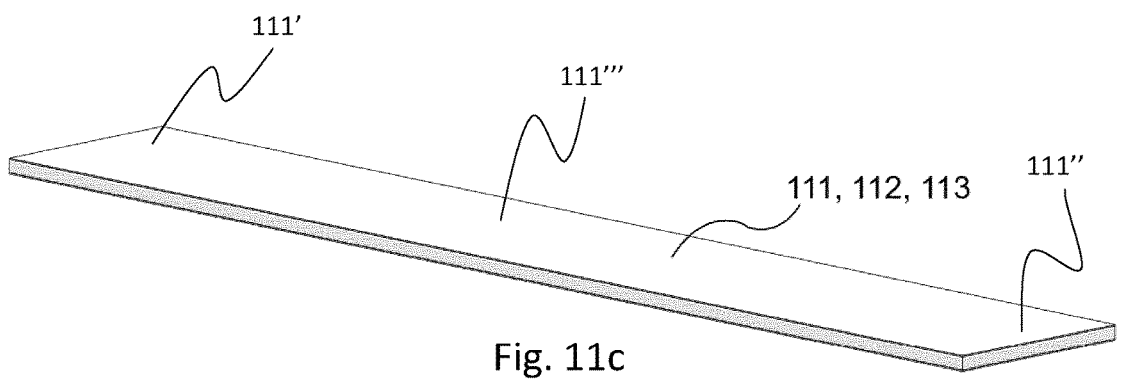

FIG. 11a-c shows an isometric projection of three different embodiments of an elongated member 111, 112, 113.

FIG. 11a shows that an elongated member 111, 112, 113 may be a plate with longitudinal flat stiffeners.

FIG. 11b shows that an elongated member 111, 112, 113 may be a plate with longitudinal closed stiffeners.

FIG. 11c shows that an elongated member 111, 112, 113 may be a composite sandwich element layered with concrete core and steel liners.

Figure 12:
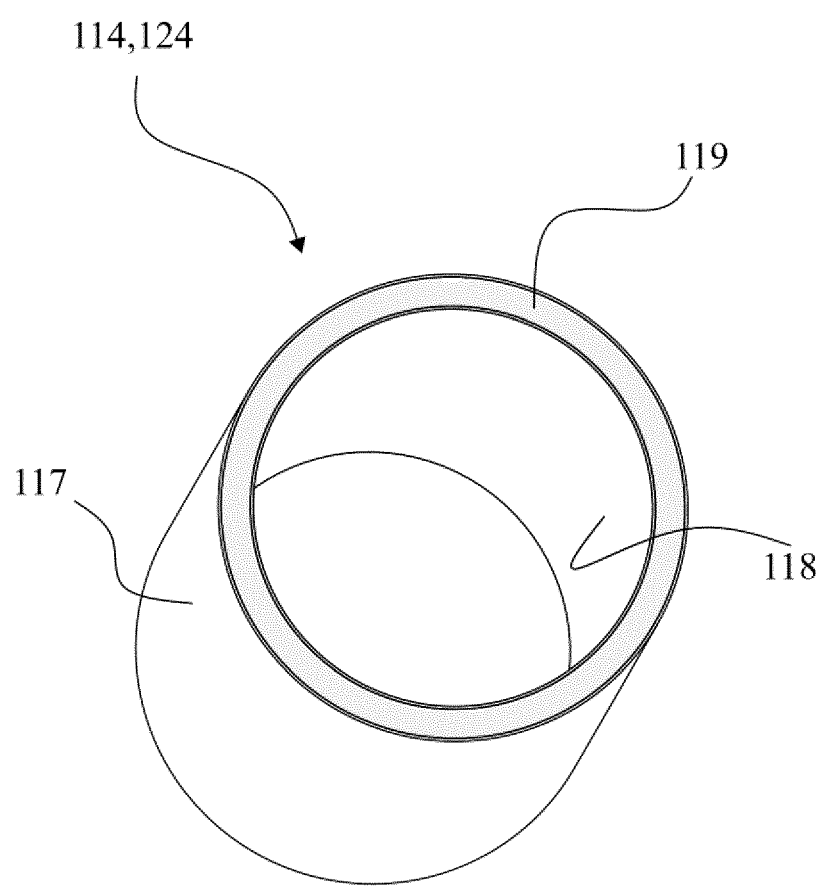
FIG. 12 shows an isometric projection of a sandwich construction which may be used in the buoyancy element or the body of the centre hub.

FIG. 12 shows that a tubular sandwich construction may comprise an outer liner 117 and an inner liner 118. An annulus 119 may be formed between the outer liner 117 and the inner liner 118. The outer liner 117 is preferably concentric to the inner liner 118. The annulus 119 may be filled with concrete. In this way a sandwich element is formed which may be used in the buoyancy element 114 or the body 124 of the centre hub 120.

Corrosion protection of the stiffening means 115 in the splash zone can be corrosion allowance or coating. Corrosion protection for cable or strand stiffening means can preferably be tube coating and more preferably tube coating from vulcanized rubber sheets.

Figure 13:
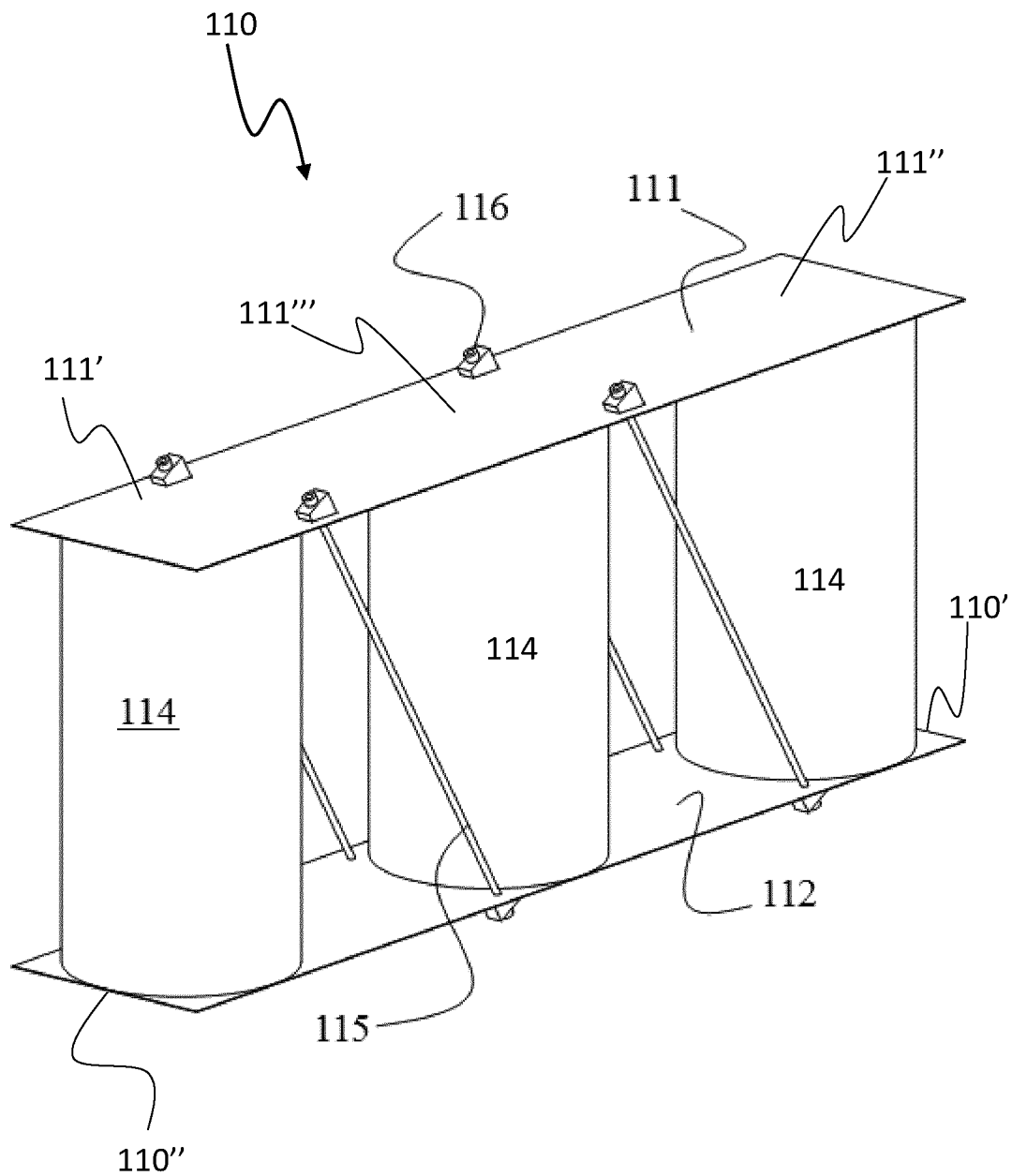
FIG. 13 shows an isometric projection of the elongated element with an alternative set of stiffening means.

FIG. 13 shows an isometric projection of the elongated element 110 with an alternative set of stiffening means 115. The stiffening means 115 may be arranged singly. By singly it is understood that two stiffening means 115 are not arranged such that they pairwise substantially form an X-shape, it may still be a plurality of stiffening means 115 arranged on the same elongated element 110. The stiffening means 115 may be arranged perpendicular to or inclined relative to the elongated members 111, 112, 113. When a plurality of stiffening means 115 are provided, they may be arranged in parallel or with an angle relative to each other. This alternative set of stiffening means 115 may be applicable for all elongated elements 110, independent of the number of buoyancy elements 114 and the number of layers.

Stiffening means 115 may be connected to the edges of the elongated members 11, 112, 113.

Figure 14:
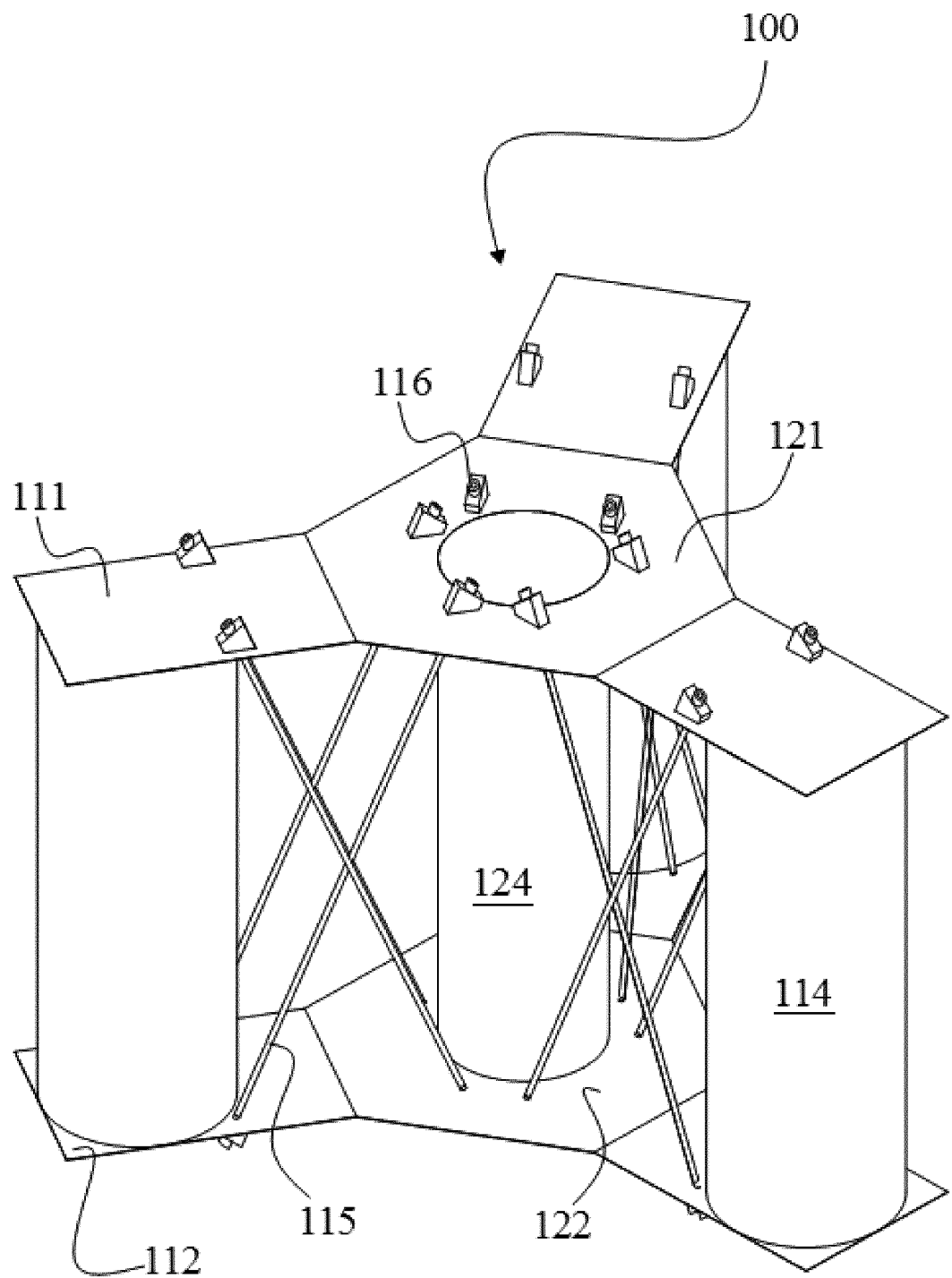
FIG. 14 shows an isometric projection of a wind turbine platform with elongated elements with one buoyancy element each.

FIG. 14 shows an isometric projection of a floating wind turbine platform 100 comprising three elongated elements 110 (a first elongated element 110, a second elongated element 110 and a third elongated element 110) each comprising one buoyancy element 114. The elongated elements 110 may further comprise stiffening means 115. The stiffening means 115 may extend from the elongated element 110 to the centre hub 120. Alternatively, the stiffening means 115 may be arranged on the elongated element 110 only.

Figure 15:
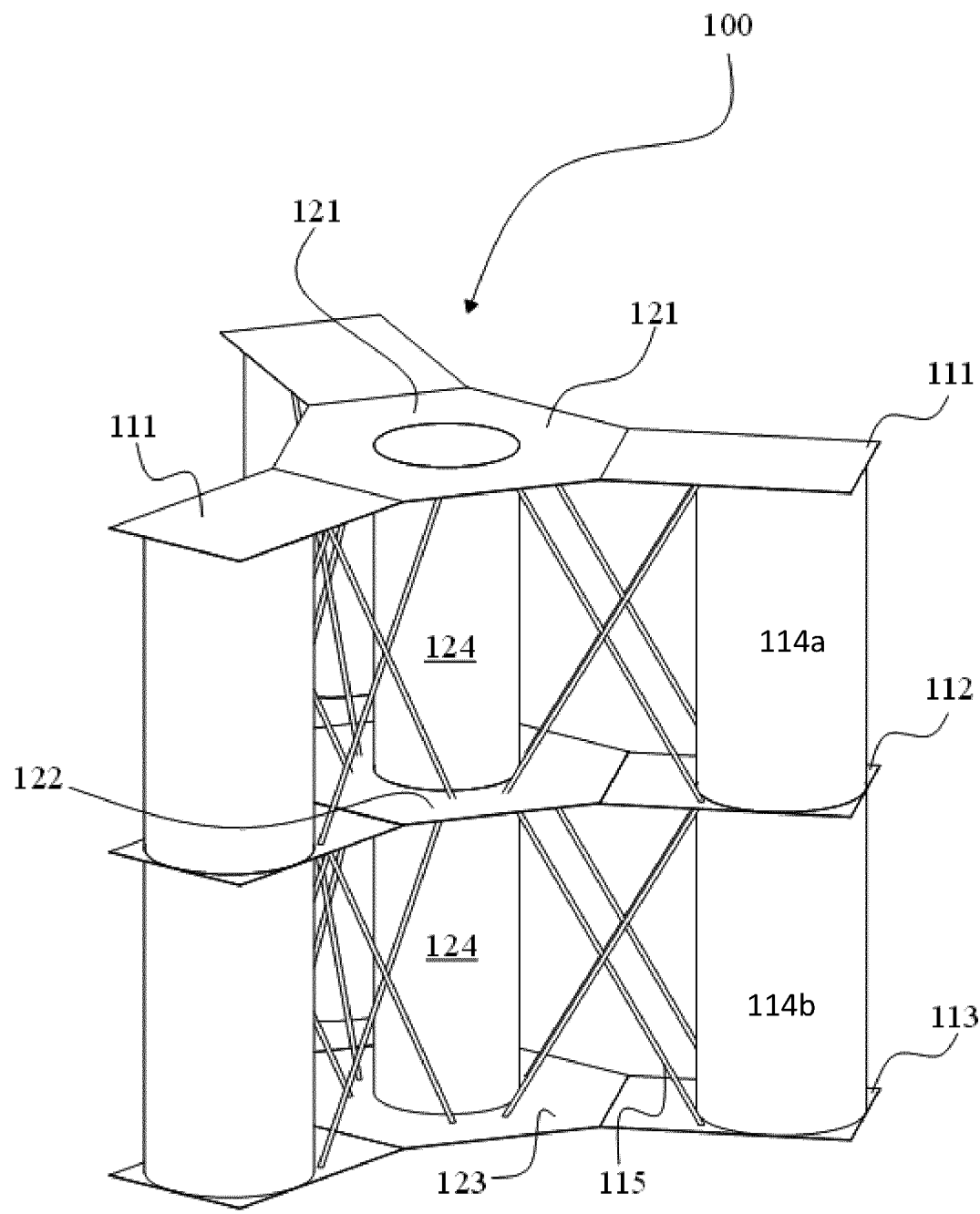
FIG. 15 shows an isometric projection of a wind turbine platform in a double layered elongated element configuration with elongated elements with one buoyancy element in each layer.

FIG. 15 shows an isometric projection of a floating wind turbine platform 100 in a double layered elongated element configuration comprising three elongated elements 110 (a first elongated element 110, a second elongated element 110 and a third elongated element 110) each comprising one buoyancy element 114a, 114b in each layer. The elongated elements 110 may further comprise stiffening means 115. The stiffening means 115 may extend from the elongated element 110 to the centre hub 120. Alternatively, the stiffening means 115 may be arranged on the elongated element 110 only.

Figure 16:
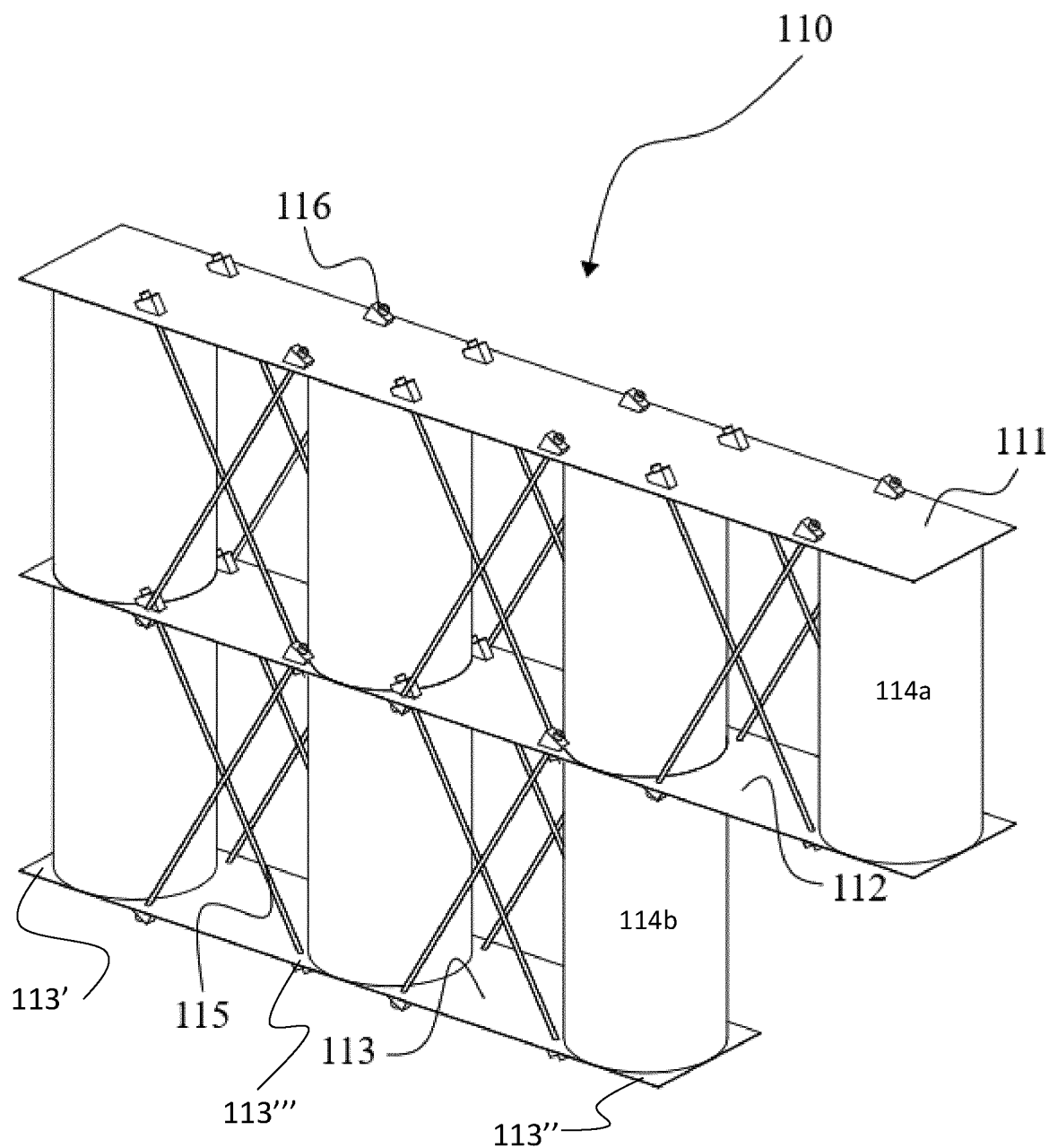
FIG. 16 shows an isometric projection of a double layered elongated element in which the layers are of different lengths.

FIG. 16 shows an isometric projection of a double layered elongated element 110 in which the layers are of different lengths. The different layers of the elongated element 110 may comprise a different number of buoyancy elements 114a, 114b. The different layers of the elongated element 110 may comprise a different number of stiffening means 115. The different elongated members 111, 112, 113 of the elongated element 110 may have different lengths.

The stiffening means 115 may be pretensioned with anchor and shoe 116. The anchor and shoe 116 can be located inside or outside the elongated members 111, 112, 113. With reference to FIG. 16, the shoe 116 may be located on the outside with the stiffening means 115 protruding the elongated member 111, 112, 113. Outside position of the shoe 116 lead to compressive stress between shoe 1116 and elongated member 111, 112, 113. This disclosure provides an innovative approach towards design suited to current wind farm developer requirements in that the simplicity of the geometrical elements enables a reduced set of structural parameters that will accelerate design iterations in a schedule driven environment. The gap between the buoyancy elements 114 provides an important parameter for tuning the water resistance versus structural stiffness. The diameter of the individual buoyancy elements 114 may be understood as the diameter of the minimum circumcised circle around the cross-sectional shape of said buoyancy elements 114. The diameter and height of the individual buoyancy elements 114 are parameters that can be varied in conjunction with the gap parameter to optimize the structural capacity and motion characteristics.

The floating wind turbine platform 100 may comprise a system for station keeping. Said station keeping system may comprise components from the group comprising mooring system and thrusters. A mooring system may comprise components from the group comprising synthetic fibre rope, steel chain, steel cable, mass elements, buoyancy elements, damping elements. Said mooring system may be anchored to seabed by any type of anchors including suction anchors and torpedoes.

Triangular and rectangular floating wind turbine platforms 100 may have a mooring system connected to one or several corners of the triangular or rectangular shape. If the tower 200 is arranged in one of the corners, the mooring system may preferably be connected at least to one of the other corners.

The access systems may be selected from the group comprising sea ladder, boat bumpers, helicopter hoist station and helicopter lading pads. The floating wind turbine platform 100 may comprise corrosion protection. Said corrosion protection may be selected from the group comprising of sacrificial anodes, coating and impressed current.

The floating wind turbine platform 100 may comprise ballast.

The floating wind turbine platform 100 may comprise an active ballast system. Said active ballast system can have autonomous or manual control. Said active ballast system can displace ballast to change the trim and draft of the floating wind turbine platform 100. The ballast may be static and trim and draft may be changed using temporary ballast pumps.

The floating wind turbine 1000 may comprise stay cables 500 between the wind turbine tower 200 and the floating wind turbine platform 100.

The floating wind turbine 1000 may comprise an extension of the central column 400 to a draft below the elongated elements 110 of the floating wind turbine platform 100. The floating wind turbine 1000 may comprise stay cables 500 connecting the elongated elements 110 to the central column 400. The central column 400 may be utilized for larger water depths to include partly spar buoy effects.

The material of the floating wind turbine platform 100 may be selected from the group comprising of metal, polymer, composite and ceramic including concrete.

The floating wind turbine platform 100 may comprise a structural monitoring system. Said monitoring system may comprise home-base communication, continuously transmitting the state of all predefined characteristic structural parameters, enabling predictive maintenance, just-in-time operational decisions and detailed learning models for improved design optimization.

Figure 17:
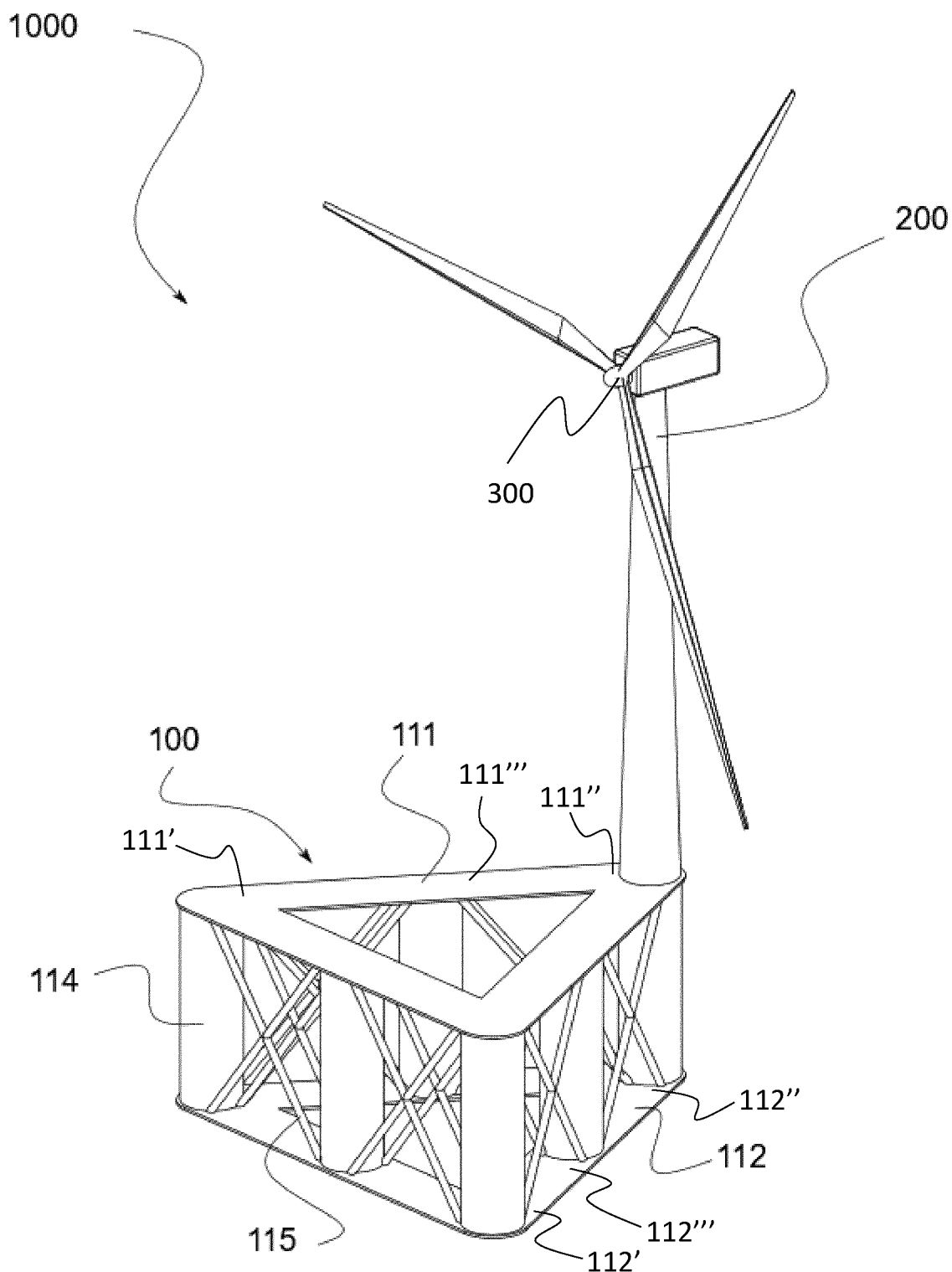
FIG. 17 shows an isometric projection of a floating wind turbine comprising a triangular floating wind turbine platform and a horizontal axis turbine.

FIG. 17 shows an isometric projection of a floating wind turbine 1000. The floating wind turbine 1000 may comprise a triangular floating wind turbine platform 100 and a horizontal axis turbine 300. The triangular floating wind turbine platform 100 may comprise three elongated elements 110 (a first elongated element 110, a second elongated element 110 and a third elongated element 110). The elongated elements 110 are illustrated as one layered but may also be multi layered.

One or all the elongated member 111, 112, 113 of a triangular floating wind turbine platform 100 may be separate members that are connected during fabrication or made as one piece, e.g. one plate.

FIG. 17 shows how a horizontal axis turbine 300 may be arranged on a tower 200 arranged on top of the triangular floating wind turbine platform 100. The tower 200 is preferably arranged in one of the corners of the triangular floating wind turbine platform 100. Alternatively, the tower may be arranged between two corners of the triangular floating wind turbine platform 100. The tower 200 may be arranged on the elongated member 111, at an opposite side of the buoyancy element 114.

FIG. 17 shows how the tower 200 may extend substantially perpendicularly on the floating wind turbine platform 100. In this way the tower 200 will primarily extend vertically in use.

Figure 18:
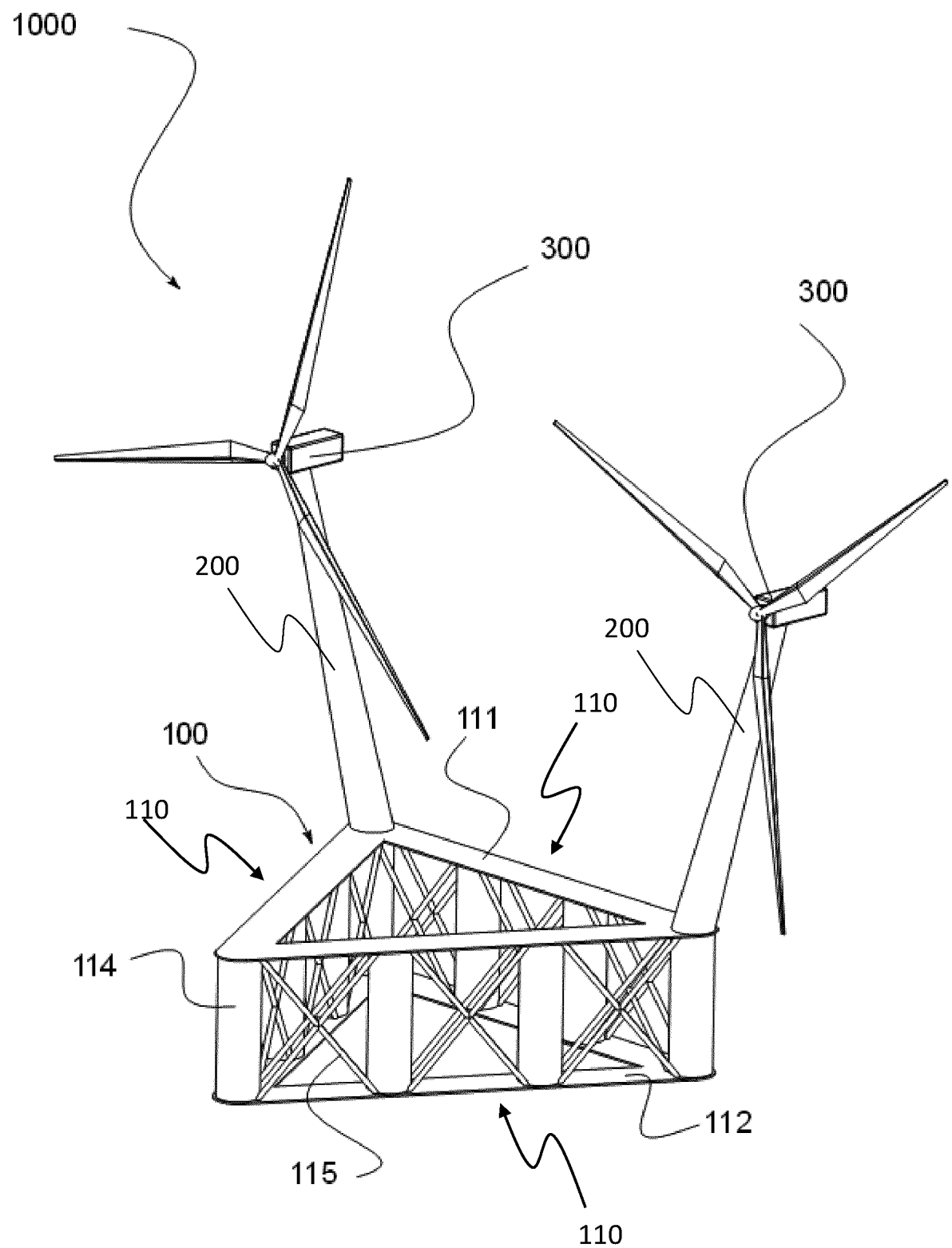
FIG. 18 shows an isometric projection of a floating wind turbine comprising a triangular floating wind turbine platform and two horizontal axis turbines.

FIG. 18 shows an isometric projection of a floating wind turbine 1000. The floating wind turbine 1000 may comprise a triangular floating wind turbine platform 100 and a plurality of horizontal axis turbines 300, e.g. two horizontal axis turbines 300. The horizontal axis turbines 300 may be arranged in respective corners of the triangular floating wind turbine platform 100.

Figure 20:
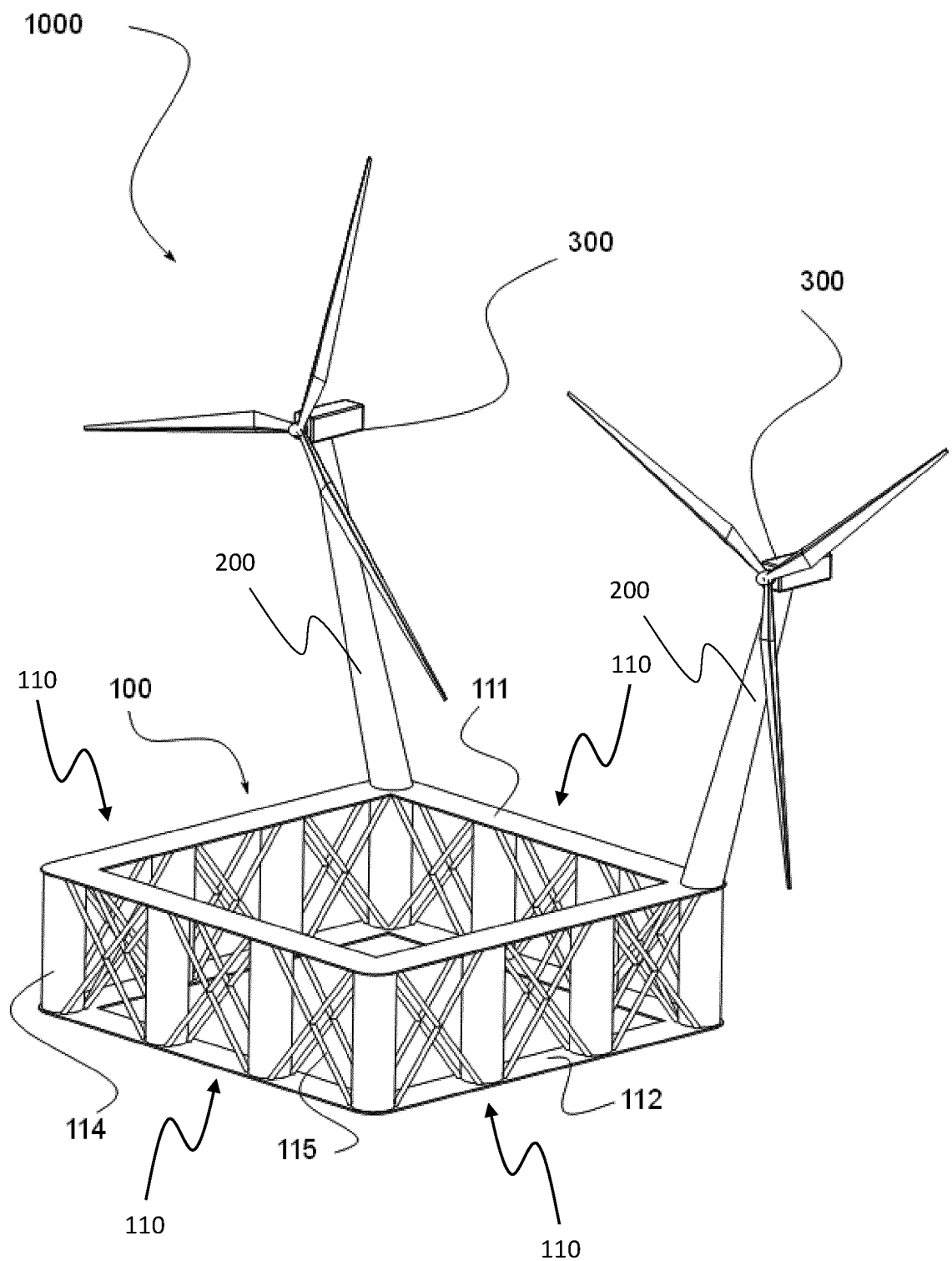
FIG. 20 shows an isometric projection of a floating wind turbine comprising a rectangular floating wind turbine platform and two horizontal axis turbines.

FIG. 18 and FIG. 20 show how the tower 200 may extend at an angle relative to the floating wind turbine platform different than 90 degrees. In this example two horizontal axis turbines 300 are arranged on the floating wind turbine platform 100, and their towers 200 are angled away from each other, such that the horizontal distance between the horizontal axis turbines 300 are larger than the horizontal distance between the connection point of the towers 200 on the floating wind turbine platform 100.

As the number of horizontal axis turbines 300 increase on the floating wind turbine platform 100, the required buoyancy will increase. This can be solved by increasing the volume of each buoyancy element 114 and/or increasing the number of buoyancy elements 114.

In the exemplifying drawings a triangular floating wind turbine platform 100 comprising one horizontal axis turbine 300 is illustrated with six buoyancy elements 114. And a triangular floating wind turbine platform 100 comprising two horizontal axis turbines 300 is illustrated with nine buoyancy elements 114.

In the exemplifying drawings a rectangular floating wind turbine platform 100 comprising one horizontal axis turbine 300 is illustrated with eight buoyancy elements 114. And a rectangular floating wind turbine platform 100 comprising two horizontal axis turbines 300 is illustrated with twelve buoyancy elements 114.

As illustrated in FIGS. 17-20, connected elongated elements 110 may share one buoyancy element 114.

Figure 19:
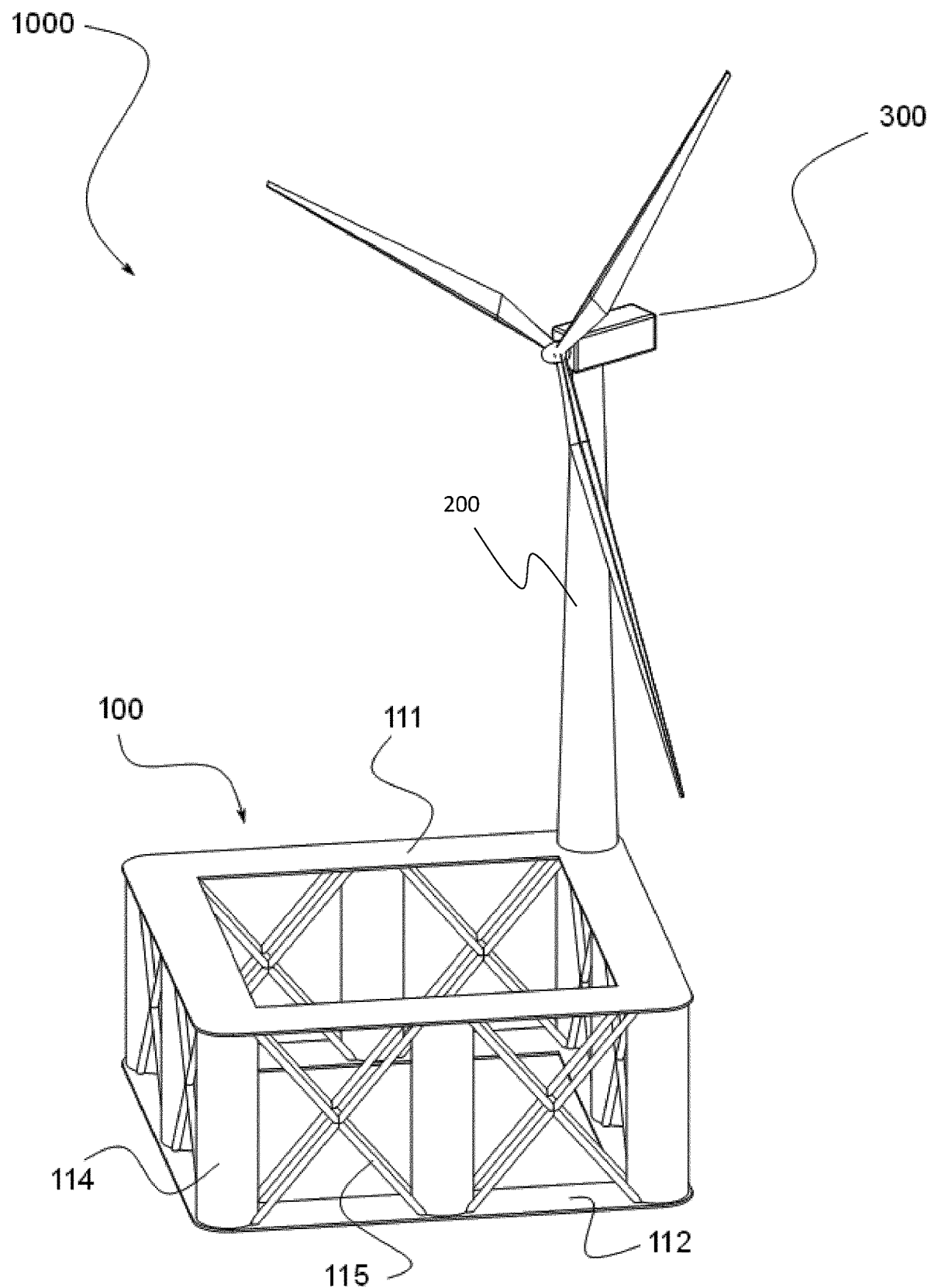
FIG. 19 shows an isometric projection of a floating wind turbine comprising a rectangular floating wind turbine platform and a horizontal axis turbine.

FIG. 19 shows an isometric projection of a floating wind turbine 1000 comprising a rectangular floating wind turbine platform 100 and a horizontal axis turbine 300.

The rectangular floating wind turbine platform 100 comprises four elongated elements 110 (a first elongated element 110, a second elongated element 110, a third elongated element 110 and a fourth elongated element 110). In FIG. 18, the elongated elements 110 have equal lengths and are orthogonally arranged, i.e. as a square. However, the elongated elements 110 may have different lengths, e.g. two and two elongated elements 110 having equal lengths. The elongated elements 110 may not be orthogonally arranged, e.g. having two obtuse angles and two acute angles.

FIG. 19 shows how a horizontal axis turbine 300 may be arranged on a tower 200 arranged on top of the rectangular floating wind turbine platform 100. The tower 200 is preferably arranged in one of the corners of the rectangular floating wind turbine platform 100. Alternatively, the tower may be arranged between two corners of the rectangular floating wind turbine platform 100. The tower 200 may be arranged on the elongated member 111, at an opposite side of the buoyancy element 114.

FIG. 19 shows how the tower 200 may extend substantially perpendicularly on the floating wind turbine platform 100. In this way the tower 200 will primarily extend vertically in use.

FIG. 20 shows an isometric projection of a floating wind turbine 1000. The floating wind turbine 1000 may comprise a rectangular floating wind turbine platform 100 and a plurality of horizontal axis turbines 300, e.g. two horizontal axis turbines 300.

The horizontal axis turbines 300 may be arranged in respective corners of the rectangular floating wind turbine platform 100.

As shown in FIGS. 17-20, each elongated element 110 may have a first end and an opposite second end. The elongated elements 110 may be arranged in the same plane. One of the first end or the second end of each of the elongated elements 110 may be connected to one of the first end or the second end of at least one of the other elongated elements 110, i.e. two and two of the elongated elements 110 may be connected to each other at one of their first or second ends. In FIGS. 17-20 these are connected directly to each other. As an alternative, these can be connected to each other indirectly, e.g. via the central hub 120 as illustrated in FIG. 3.

FIG. 17 shows how the first elongated element 110 at its first end may be connected to the first end of the second elongated element 110. The first elongated element 110 may further be connected at its second end to the first end of a third elongated element 110. Furthermore, the second elongated element 110 may at its second end be connected to the second end of the third elongated element 110.

In FIGS. 17-18 it is shown how each of the elongated elements 110 at their ends are directly connected to all the other elongated elements 110.

In FIGS. 17-20 it is shown how each of the elongated elements 110 are connected to another elongated element 110 in both their first and second ends.

Other and further embodiments utilizing one or more aspects of the disclosure described above can be devised without departing from the spirit of the disclosure. The embodiments have generally been described in terms of welding for coupling the sections together, because the general state of the art is conducive to welding, but the disclosure is not limited to welding and can include any suitable form of coupling, such as clamping, grouting, fastening, and other coupling means as further defined herein. Other variations in the system are possible.

Further, the various methods and embodiments of the system can be included in combination with each other to produce variations of the disclosed methods and embodiments. Discussion of singular elements can include plural elements and vice-versa. References to at least one item followed by a reference to the item may include one or more items. Also, various aspects of the embodiments could be used in conjunction with each other to accomplish the understood goals of the disclosure. Unless the context requires otherwise, the word "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. The device or system may be used in several directions and orientations. The term "coupled," "coupling," "coupler," and like terms are used broadly herein and may include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and may further include without limitation integrally forming one functional member with another in a unity fashion. The coupling may occur in any direction, including rotationally.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventive subject matter has been described in the context of preferred and other embodiments and not every embodiment has been described. Obvious modifications and alterations to the described embodiments are available to those of ordinary skill in the art. The disclosed and undisclosed embodiments are not intended to limit or restrict the scope or applicability of the disclosure conceived of by the Applicant, but rather, in conformity with the patent laws, Applicant intends to protect fully all such modifications and improvements that come within the scope or range of equivalent of the following claims.

REFERENCE LIST

100—floating wind turbine metal platform
    $\alpha_1$, $\alpha_2$, $\alpha_3$—angles between neighbouring elongated elements
  110, 110*a-c*—elongated element, first-third
  110', 110"—first and second end of elongated element
    111—first elongated member
    111', 111", 111'"13 first, second and intermediate portion of the first elongated member
    112—second elongated member
    112', 112", 112'"—first, second and intermediate portion of the second elongated member
    113—third elongated member
    113', 113", 113'"—first, second and intermediate portion of the third elongated member
    114, buoyancy element
    114*a*, 114*b*—first and second buoyancy element
    115—stiffening means
    116—shoe
    117—outer liner
    118—inner liner
    119—annulus
  120—centre hub
    121—first flange
    122—second flange
    123—third flange
    124—body
    A—centre line
200—tower
300—horizontal axis turbine
400—central column
500—stay cable
1000—floating wind turbine

The invention claimed is:

1. A floating wind turbine metal platform for supporting a wind turbine, wherein the platform comprises:
    three elongated elements, wherein each elongated element comprises:
      a first elongated member;
      a second elongated member parallel to the first elongated member; and
      at least a first buoyancy element connected to the first elongated member and the second elongated member,
    wherein each elongated element has a first end and an opposite second end,
    wherein one of the first end and the second end of each of the elongated elements is connected to one of the first end and the second end of at least one of the other elongated elements,
    wherein the first elongated member comprises a first end portion, a second opposite end portion and therebetween an intermediate portion,
    wherein the second elongated member comprises a first end portion, a second opposite end portion and therebetween an intermediate portion,
    wherein at least one of the first buoyancy element is cylinder-shaped,
    wherein the first buoyancy element is connected to the intermediate portions of the first elongated member and the second elongated member,
    wherein at least one of the elongated members of each elongated element is a stiffened plate, and
    wherein each elongated element further comprises a stiffening means for stiffening of parallel elongated members.

2. The platform according to claim 1,
    wherein the first buoyancy element comprises a first end surface and an opposite second end surface,
    wherein the first elongated member is connected to the first end surface of the first buoyancy element, and wherein the second elongated member is connected to the second end surface of the first buoyancy element.

3. The platform according to claim 1,
wherein the elongated elements are arranged in the same plane.

4. The platform according to claim 1,
wherein each elongated element further comprises:
   a third elongated member parallel to the first and second elongated members; and
   a second buoyancy element connected to the second elongated member and the third elongated member.

5. The platform according to claim 4,
wherein the first buoyancy element and the second buoyancy element are connected to opposite sides of the second elongated member and arranged in alignment with each other.

6. The platform according to claim 4,
wherein the first buoyancy element and the second buoyancy element are connected to opposite sides of the second elongated member and arranged in misalignment with each other.

7. The platform according to claim 1,
wherein the at least one buoyancy element comprises:
   an outer liner;
   an inner liner concentric to the outer liner and having a smaller diameter than the outer liner; and
   an annulus between the outer liner and the inner liner;
wherein the annulus is filled with concrete.

8. The platform according to claim 1,
wherein the at least one buoyancy element has planar interfaces with at least two of the first elongated member, the second elongated member, and/or the third elongated member.

9. The platform according to claim 1,
wherein the platform comprises:
   a center hub,
wherein the elongated elements are connected to the center hub and arranged with regular angular spacing.

10. A floating wind turbine comprising:
the floating wind turbine metal platform according to claim 1;
a tower connected to the platform; and
a horizontal axis wind turbine connected to the tower.

11. The floating wind turbine-according to claim 10,
wherein the metal platform comprises a center hub having a center axis, and the tower extends along the center axis.

12. The floating wind turbine according to claim 10,
wherein the floating wind turbine further comprises:
   stay cables having first ends connected to the elongated elements and second ends connected to the tower.

13. The floating wind turbine according to claim 10,
wherein the floating wind turbine further comprises:
   a central column connected to the platform extending in an opposite direction of the tower and preferably arranged concentric with the tower.

14. The floating wind turbine according to claim 13,
wherein the floating wind turbine further comprises:
   stay cables having first ends connected to the elongated elements and second ends connected to the central column.

15. The platform according to claim 1,
wherein each elongated element comprises a plurality of the first buoyancy elements;
wherein one first buoyancy element is connected to the first end portions of the first and second elongated members; and/or
wherein one first buoyancy element is connected to the second end portions of the first and second elongated members.

16. The platform according to claim 1,
wherein a plurality of the first buoyancy elements are connected to the intermediate portions of the first and second elongated members.

17. The platform according to claim 1,
wherein two connected elongated elements have one common first buoyancy element.

* * * * *